(12) United States Patent
Nanbu et al.

(10) Patent No.: US 6,763,335 B1
(45) Date of Patent: Jul. 13, 2004

(54) PURCHASE REQUEST APPARATUS AND SYSTEM

(75) Inventors: Yoshihide Nanbu, Tokyo (JP); Hideo Haga, Tokyo (JP); Masanori Konno, Tokyo (JP); Yoshinori Kato, Hachioji (JP); Masayuki Sofue, Misato (JP); Masahiro Yamamoto, Kawasaki (JP); Masaya Watanuki, Tokyo (JP); Satoshi Takenaka, Urawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/385,841

(22) Filed: Aug. 30, 1999

(30) Foreign Application Priority Data

Sep. 1, 1998 (JP) ............................................ 10-247512

(51) Int. Cl.[7] ............................................. G06F 17/60
(52) U.S. Cl. ........................................ 705/26; 705/27
(58) Field of Search ..................... 705/26–27; 345/753, 345/777, 340, 790; 707/522; G06F 17/60

(56) References Cited

U.S. PATENT DOCUMENTS

| | | | | |
|---|---|---|---|---|
| 4,890,257 A | * | 12/1989 | Anthias et al. | |
| 5,487,143 A | * | 1/1996 | Southgate | 345/790 |
| 5,623,681 A | * | 4/1997 | Rivette et al. | 707/522 |
| 5,664,110 A | * | 9/1997 | Green et al. | 705/26 |
| 5,664,130 A | * | 9/1997 | Griffiths | 345/340 |
| 5,721,852 A | * | 2/1998 | Porter | 345/777 |
| 5,903,878 A | * | 5/1999 | Talati et al. | 705/26 |
| 6,239,798 B1 | * | 5/2001 | Ludolph et al. | 345/340 |
| 6,292,204 B1 | * | 9/2001 | Carleton et al. | 345/753 |

FOREIGN PATENT DOCUMENTS

| | | | | |
|---|---|---|---|---|
| EP | 1178451 A2 | * | 2/2002 | G06F/17/60 |
| JP | 07-093414 | | 4/1995 | |
| JP | 09044567 A | | 2/1997 | |
| JP | 09-171529 | | 6/1997 | |
| JP | 09-31970-5 | | 12/1997 | |
| JP | 10-049598 | | 2/1998 | |
| JP | 10-190719 | | 7/1998 | |

OTHER PUBLICATIONS

From http://www.archives.org for an archived history of Internet operation of web site http://www.officedepot.com.*
From http://www.archives.org for an archived history of Internet operation of web site http://www.compusa.com.*
From Dialog File 9, acc. No. 01879646, Face of the future, Marketing Computers, v 17, n7, p 34+. . . Jul. 1997.*
Yu et al., PGPUB–Document–No.: 20020123938, Systems and methods to facilitate a transaction wherein a purchase is associated with an approver, filed Mar. 1, 2001.*
From Dialog file 763 (acc. No. 00081832), Company profiles: Standard Register Company, Apr. 1995, (2 pages).*
From Dialog file 264 (acc. No. 0003521), News bits & bytes, CNS outlook, Feb. 21, 1996, vol. 4, issue 4, (4 pages).*

(List continued on next page.)

*Primary Examiner*—Cuong Nguyen
(74) *Attorney, Agent, or Firm*—Fitzpatrick, Cella, Harper & Scinto

(57) ABSTRACT

In an existing or new client/server system environment in which a plurality of clients are connected on a network, a function of specifying (selecting) a desired article by a requester, a function of requesting an approver to approve purchase of the specified article, and a function of determining approval or rejection for purchase of the approval-requested article by the approver are realized. A user logs in to this system as a requester or approver from a predetermined Web page displayed on the client in accordance with the user (employee) ID. A user who has logged in as an approver can also use the article specifying function and approval request function.

5 Claims, 31 Drawing Sheets

OTHER PUBLICATIONS

From Dialog, file 267 (acc. No. 00031905), Software offers controls for online ordering OBI standard provides uniform catalog requirements, Treasury Manager's Report, Sep. 12, 1997 vol. 5 issue 19 (3 pages).*

From Dialog, file 20, (acc. No. 02091628), University of Rochester selects NEC BCS to install new communications network, Business Wire, Jul. 2, 1998 (2 pages).*

From Dialog, file 20 (acc. No. 02452288), NEC: Shands Healthcare selects NEC to upgrade communications, M2 Presswire, Aug. 7, 1998 (2 pages).*

Wojtas et al., The 1991 guide: a galaxy of software . . . , Direct Marketing v54n2, pp. 19–34, Jun. 1991 (29 pages).*

* cited by examiner

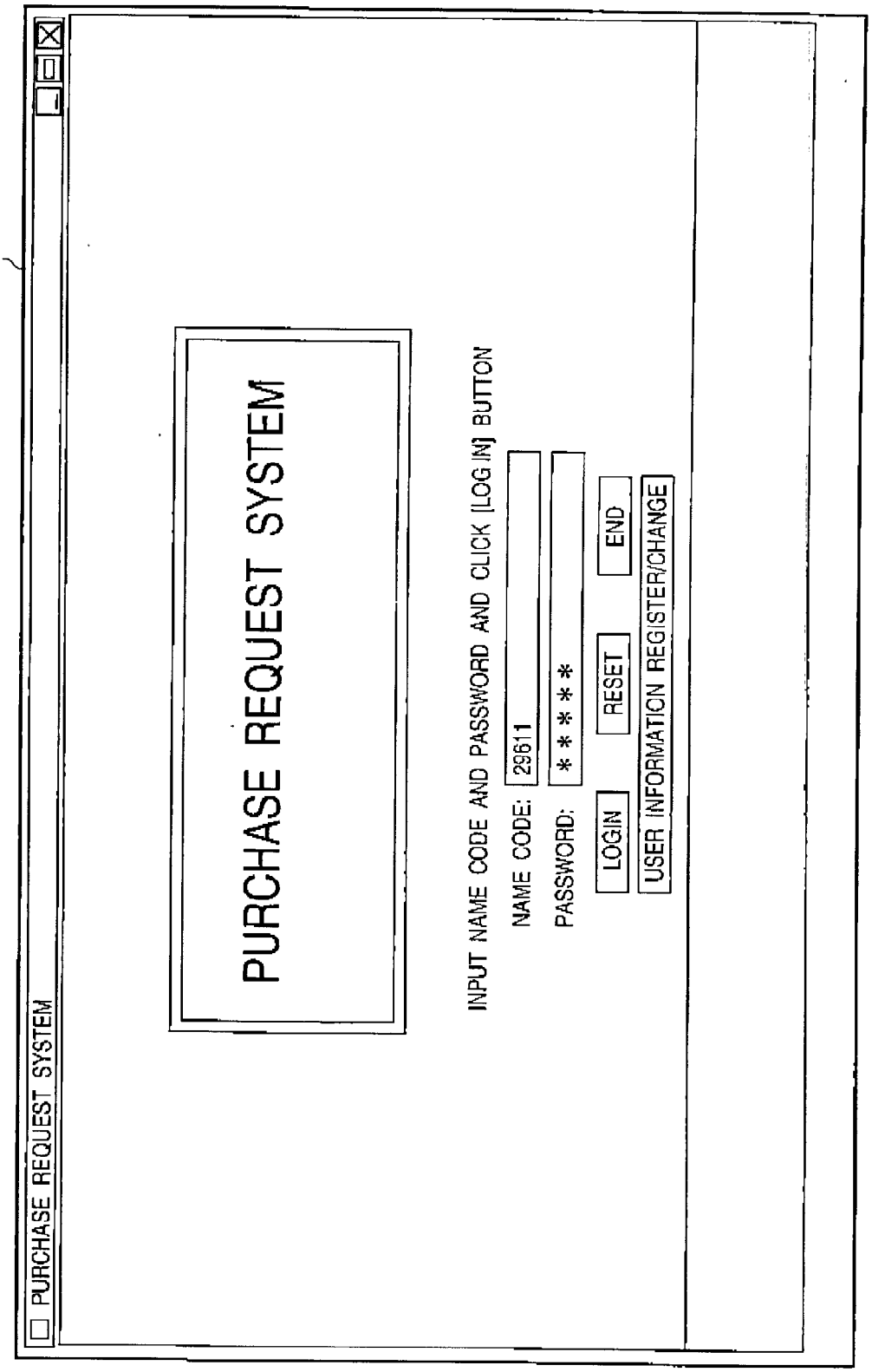

FIG. 10

☐ PURCHASE REQUEST SYSTEM                                    01-02-01(01-02-02)

USER INFORMATION REGISTER/CHANGE          [REGISTER · UPDATE] [RETURN]

USER: MANAGEMENT SECTION, HANAKO JOHO

PASSWORD CHANGE

NEW PASSWORD: [         ]

NEW PASSWORD RE-INPUT: [         ]

E-MAIL ADDRESS: [hana@XYZ.co.jp]   ☐ NO ADDRESS

DO YOU REQUIRE NOTIFICATION FROM SYSTEM?  Y⊙  N◯

EXTENSION NUMBER [612-26256]   EXAMPLE : 612-26235

REGISTRATION/CHANGE OF PASSWORD :INPUT NEW PASSWORD AND CLICK [REGISTER · UPDATE] BUTTON

REGISTRATION/CHANGE OF E-MAIL :INPUT OR CORRECT E-MAIL EXTENSION NUMBER AND CLICK
EXTENSION NUMBER            [REGISTER · UPDATE] BUTTON
                            CHECK "NO ADDRESS" IF YOU HAVE NO E-MAIL ADDRESS

APPROVAL TARGET SECTION SETTING                    [REGISTER] [DELETE]

· TO REGISTER (ADD) TARGET APPROVAL SECTION, INPUT POST
  CODE AND CLICK "REGISTER" BUTTON
· TO DELETE TARGET APPROVAL SECTION, CLICK RADIO BUTTON
  OF SECTION TO BE DELETED AND THEN "DELETE" BUTTON

POST CODE: [    ]

| SELECT | BUSINESS OFFICE NAME | DEPARTMENT NAME | SECTION CODE | SECTION NAME |
|--------|---------------------|-----------------|--------------|--------------|
| ☐ | TOKYO | PROMOTION DEPARTMENT | 1488 | MANAGEMENT SECTION |

FIG. 11

| | | | | | | | |
|---|---|---|---|---|---|---|---|
| □ PURCHASE REQUEST SYSTEM | | | | | | | 02-01-01 |

| 0 ARTICLES SELECTED | PURCHASE REQUEST | REQUEST STATE | ACCEPTANCE RESULT | END | ? | | |
|---|---|---|---|---|---|---|---|

DESIGNATE SEARCH CONDITIONS AND DISPLAY FROM AND CLICK "SEARCH" BUTTON

⊙ REQUESTER ○ EXPENSE PAYER    ⊙ REQUESTER ○ APPROVER    REQUEST NUMBER: ▢    NUMBER OF REQUESTS TO BE DISPLAYED IN LIST: 15 REQUESTS ▼
SECTION CODE: 1488    NAME CODE: A0002    STATE: ALL ▼    ⊙ STATUS WINDOW  ○ EXPENSE WINDOW    SEARCH

REQUEST STATE (STATUS)    RE-LOAD    REQUESTER CHANGE    APPROVAL REQUEST    CORRECT    WITHDRAW    DELETE

N REQUESTS ARE PRESENT IN DATABASE. 1 TO 7 OUT OF THEM ARE DISPLAYED.
TO DISPLAY DETAILS, CLICK REQUEST NUMBER

| SELECT | MESSAGE | STATE | REQUEST NUMBER | REQUESTER NAME | ARTICLE NAME | REQUESTED NUMBER OF ITEMS | ESTIMATED AMOUNT | DESIRED |
|---|---|---|---|---|---|---|---|---|
| ○ | | REGISTERED | A8000248 | XXXXXX XXXX | XXXXXXX XXXXXXXXXXXX | 1PC | ¥85 | 199 |
| ○ | ● | REGISTERED | A8000242 | XXXXXX XXXX | XXXXXXX XXXXXXXXXXXX | 1BT | ¥45 | 199 |
| ○ | | REGISTERED | A8000241 | XXXXXX XXXX | XXXXXXX XXXXXXXXXXXX | 1ST | ¥25 | 199 |
| ○ | WAIT FOR APPROVAL | | A8000239 | XXXXXX XXXX | XXXXXX XXXXXXXXXXX | 1ST | ¥25 | |
| ○ | | APPROVED | A8000233 | XXXXXX XXXX | XXXXXXX XXXXXXXXXXXX | 1PC | ¥30,450 | 199 |
| ○ | | APPROVED | A8000232 | XXXXXX XXXX | XXXXXXX XXXXXXXXXXXX | 1PC | ¥20,787 | 199 |

FIG. 12

DESIGNATE SEARCH CONDITION AND DISPLAY FROM AND CLICK "SEARCH" BUTTON

⊙ REQUESTER ○ EXPENSE PAYER
SECTION CODE : 1488

⊙ REQUESTER ○ APPROVER
NAME CODE : A0002

REQUEST NUMBER :
STATE : ALL ▼

NUMBER OF REQUESTS TO BE DISPLAYED IN LIST : 15 REQUESTS ▼
⊙ STATUS WINDOW
○ EXPENSE WINDOW
SEARCH

PURCHASE REQUEST SYSTEM   03-02-00

[0 ARTICLES SELECTED] [PURCHASE REQUEST] [REQUEST STATE] [ACCEPTANCE RESULT] [END] [?] [RETURN] [MANY-ITEM REQUEST] [ONE-ITEM REQUEST]

CATALOG LIST

41 ARTICLES ARE PRESENT IN DATABASE. 1 TO 15 OUT OF THEM ARE DISPLAYED. TO DISPLAY DETAILS OF ARTICLE, CLICK "ARTICLE NAME". SELECT DESIRED ARTICLE AND CLICK [MANY-ITEM REQUEST] OR [ONE-ITEM REQUEST]

SEARCH KEY : OFFICE SUPPLIES → COLOR LABEL → ABC

| SELECT | NO. | ARTICLE NAME ▲ | TYPE | ARTICLE INFORMATION | ESTIMATED UNIT PRICE | PERCENTAGE DELAY DISTRIBUTION | MAKER | MERCHANDISE CODE | REMARKS |
|---|---|---|---|---|---|---|---|---|---|
| ☐ | 1 | XXXX XXXXXXXX XXXX XXXXX XXXXXX XXXX | F-12K | [1] | ¥1,080 | 4 | CCC | F-12K | XX |
| ☐ | 2 | XXXX XXXXXXXX XXXX XXXXX XXXXXX XXXX | F-12B | [1] | ¥1,080 | 4 | CCC | F-12B | XX |
| ☐ | 3 | XXXX XXXXXXXX XXXX XXXXX XXXXXX XXXX | F-12R | [1] | ¥1,080 | 4 | CCC | F-12R | XX |
| ☐ | 4 | XXXX XXXXXXXX XXXX XXXXX XXXXXX XXXX | C-12Y | [1] | ¥756 | 4 | CCC | C-12Y | XX |
| ☐ | 5 | XXXX XXXXXXXX XXXX XXXXX XXXXXX XXXX | C-9Y | [1] | ¥756 | 4 | CCC | C-9Y | XX |
| ☐ | 6 | XXXX XXXXXXXX XXXX XXXXX XXXXXX XXXX | C-12H | [1] | ¥756 | 4 | CCC | C-9H | XX |
| ☐ | 8 | XXXX XXXXXXXX XXXX XXXXX XXXXXX XXXX | C-8KZ | [1] | ¥756 | 4 | CCC | C-9Z | XX |
| ☐ | 9 | XXXX XXXXXXXX XXXX XXXXX XXXXXX XXXX | C-12R | | | | | | |
| ☐ | 10 | XXXX XXXXXXXX XXXX XXXXX XXXXXX XXXX | C-12B | | | | | CCC | C-12B | XX |

FIG. 16

PURCHASE REQUEST SYSTEM

| PURCHASE REQUEST | REQUEST STATE | ACCEPTANCE RESULT | END | ? |

☐ 0 ARTICLES SELECTED

INDIVIDUAL INPUT

KIND OF ITEM : COMMERCIALLY AVAILABLE SOFTWARE

KIND OF PROCUREMENT : [PURCHASE ▼]   [SELECT] [RETURN] [NEXT]

PROCURING COUNTRY : [JAPAN ▼]

FORM OF PURCHASE : [NEW ▼]

LICENSE NUMBER : [_____]   [INPUT ANOTHER CHOICE]

MAKER : [OTHERS ▼]

ARTICLE NAME : [_____]   [INPUT ANOTHER CHOICE]

TYPE : [_____]

MERCHANDISE CODE : [____]

VERSION : [_____]

OS : [Windows95 ▼]   [INPUT ANOTHER CHOICE]

PRODUCT FORM : [PACKAGE ▼]   [INPUT ANOTHER CHOICE]

MEDIA SIZE : [JAPANESE VERSION ▼]   [INPUT ANOTHER CHOICE]

LANGUAGE : [CD-ROM ▼]   [INPUT ANOTHER CHOICE]

ESTIMATED UNIT PRICE : [____] CURRENCY : [YEN ▼]  INPUT ¥0 WHEN ESTIMATED UNIT PRICE IS UNKNOWN.

REQUEST QUANTITY : [____] UNIT : [PIECES ▼]

☐ PURCHASE REQUEST SYSTEM

REQUESTED ARTICLE SELECTION LIST 03-03-00

[DELETE] [STORE QUANTITY] [MANY-ITEM DETAIL INPUT] [ONE-ITEM DETAIL INPUT]

- TO DISPLAY DETAILS, CLICK "ARTICLE NAME" (ONLY CATALOG ITEM)
  INPUT REQUEST QUANTITY AND THEN SELECT DATA AND CLICK [MANY-ITEM DETAIL INPUT]

| SELECT | NO. | KIND OF REQUEST | ARTICLE NAME | ESTIMATED UNIT PRICE | REQUEST QUANTITY | | ESTIMATED AMOUNT |
|--------|-----|-----------------|--------------|----------------------|------------------|----|------------------|
| ☐ | 1 | CATALOG | **** | ¥99.99 | | PC | |
| ☐ | 2 | CATALOG | **** | ¥99.99 | | PC | |
| ☐ | 3 | CATALOG | **** | ¥99.99 | | PC | |

FIG. 18

PURCHASE REQUEST SYSTEM  03-05-00

☐ 2 ARTICLES SELECTED | PURCHASE REQUEST | REQUEST STATE | ACCEPTANCE RESULT | END | ?

REQUESTED ARTICLE SELECTION LIST
TOTAL: ¥10,800

| NO. | ARTICLE NAME | REQUEST QUANTITY | ESTIMATED AMOUNT |
|---|---|---|---|
| 1 | XXXXXXXX | 1PC | ¥1,080 |
| 2 | XXXXXXXX | 1ST | ¥9,720 |

DETAIL INFORMATION INPUT

RETURN | REGISTER | APPROVAL REQUEST

CONFIDENTIAL: ☐

REQUESTER
SECTION CODE : 1488

EXPENSE PAYER
SECTION CODE : [1488]
ACCOUNT : [1530]  EXPENSE ITEM : [10600]
ACCOUNT LIST

DESIRED DUE DATE OF DELIVERY : [1998] YEAR [03] MONTH [31] DAY
DELIVERY BUSINESS OFFICE : TOKYO
USER : [TOKYO] ▶ PROCUREMENT INFORMATION SYSTEM MANAGEMENT SECTION

TO DESIGNATE ITEM OTHER THAN ITEMS DISPLAYED HEREIN, RETURN TO PREVIOUS PAGE AND CLICK "ONE-ITEM REQUEST".

ABOUT INPUT VALUE (SIMPLE INPUT ASSIST)

ACCOUNT TITLE THAT IS NOT PRESENT IS INPUT

FIG. 19

☐ PURCHASE REQUEST SYSTEM                                    03-05-00

| 0 ARTICLES SELECTED | PURCHASE REQUEST | REQUEST STATE | ACCEPTANCE RESULT | END | ? |

CONFIRM CONTENTS OF REQUEST AND REQUEST APPROVAL

REQUESTED ARTICLE SELECTION LIST
TOTAL : ¥10,800

| NO. | ARTICLE NAME | REQUEST QUANTITY | ESTIMATED AMOUNT |
|-----|--------------|------------------|------------------|
| 1   | XXXXXXXX     | 1PC              | ¥1,080           |
| 2   | XXXXXXXXX    | 1ST              | ¥9,720           |

DETAIL INFORMATION

```
            CONFIDENTIAL : N
 SECTION CODE OF REQUESTER : 1488
SECTION CODE OF EXPENSE PAYER : 1488
    ACCOUNT : 1530   EXPENSE ITEM : 10600
DESIRED DUE DATE OF DELIVERY : MARCH 31, 1998
      DELIVERY BUSINESS OFFICE : TOKYO
                      USER : TOKYO
                           MANAGEMENT SECTION
```

| MANAGEMENT SECTION, DEPARTMENT MANAGER SUZUKI |
| MANAGEMENT SECTION, SECTION MANAGER YAMADA |
| MANAGEMENT SECTION, OFFICE MANAGER TANAKA |
| ... |
| MANAGEMENT SECTION, SECTION MANAGER YAMADA |

05-01-00   [OK]   . OK?

APPROVAL REQUEST

APPROVAL OF THE ABOVE ITEM IS REQUESTED TO

FIG. 20

PURCHASE REQUEST SYSTEM

5 ARTICLES SELECTED | PURCHASE REQUEST | REQUEST STATE | ACCEPTANCE RESULT | DETAIL INFORMATION INPUT | CALCULATE | RETURN | REGISTER | APPROVAL REQUEST | END | ?

03-06-00

ARTICLE INFORMATION

- KIND OF ITEM: XXXXX
- KIND OF PROCUREMENT: XXXXX
- PRODUCING COUNTRY: XXXXX
- MAKER: XXXXX
- ARTICLE NAME: XXXXX
- TYPE: XXXXX
- ARTICLE CODE
- SIZE 1
- SIZE 2
- PROCUREMENT QUANTITY
- REGISTRATION NUMBER

INPUT OTHER SPECIFIC MATTERS HERE

- REQUEST NUMBER :
- CONFIDENTIAL :
- SECTION CODE OF REQUESTER :
- SECTION CODE OF EXPENSE PAYER :
- ACCOUNT :  [ACCOUNT LIST]   ITEM :
- ORDER :
- FACILITY BUDGET CODE :
- ASSET CODE :
- SECTION CODE OF FIXED ASSET SUM-UP DESTINATION :
- KIND OF INSPECTION : N
- ESTIMATED UNIT PRICE : 1,080   CURRENCY : YEN
- REQUEST QUANTITY : 1            UNIT : PIECES
- ESTIMATED AMOUNT : 1,000YEN
- DESIRED DUE DATE OF DELIVERY : 1996 YEAR ☐ MONTH ☐ DAY

INPUT MESSAGE TO APPROVER TO THE COLUMN BELOW

REQUESTER MESSAGE

OK 05-02-00

APPROVAL REQUEST (ONE-ITEM)
APPROVE THE ABOVE ITEM TO SECTION MANAGER YAMADA OF MANAGEMENT SECTION ▲ . OK?

FIG. 21

■ CROSS-CHECK CONDITION

| ACCOUNT TITLE | EXPENSE ITEM | ORDER | FACILITY BUDGET CODE | ASSET CODE | EXPENSE PAYER CODE (* : NUMERAL, E : ALPHABET) |
|---|---|---|---|---|---|
| C110 | BLANK | ESSENTIAL | | | EXCEPT 79***, 98**, E** |
| 1241 | ESSENTIAL | | BLANK | BLANK | EXCEPT 79***, 98**.* |
| 1242 | BLANK | | BLANK | BLANK | EXCEPT 79***, 98**.* |
| 1243 | 0010 | | BLANK | BLANK | EXCEPT 79***, 98**.* |
| 1250 | ESSENTIAL | | BLANK | BLANK | EXCEPT 79***, 98***.* |
| 1440 | 0080 OR 0302 | | BLANK | | E***, 79***, 98**.* |
| 1530 | ※1 | ※3 | BLANK | BLANK | EXCEPT 79***, 98***, E** |
| 2170 | | ※4 | ESSENTIAL | | EXCEPT 79***, 98***, E** |
| 2550 | ESSENTIAL | ※5 | ESSENTIAL | | EXCEPT 79***, 98***, E** |
| 1211 | ESSENTIAL | ※6 | BLANK | BLANK | EXCEPT 79***, 98***, E** |

※1 : ESSENTIAL (FIRST THREE DIGITS 355, 356, AND 357 IMPOSSIBLE), PRESENT IN EXPENSE ITEM TBL
※3 : WHEN EXPENSE ITEM HAS FIRST THREE DIGITS "103", "TN" OR BLANK
WHEN EXPENSE ITEM HAS FIRST THREE DIGITS "307", ONE OF"TR/JR/LR/KR/GR/HR" OR BLANK ;
OTHERWISE, BLANK
※4 : FIRST TWO DIGITS ARE ONE OF "JN/JW/EN/EW/LN/LW/KN/KW/GN/GW/NN/NW" OR BLANK
※5 : FIRST TWO DIGITS ARE ONE OF "HN/HW" OR BLANK
※6 : FIRST DIGIT IS "S"

FIG. 23

PURCHASE REQUEST SYSTEM

| 0 ARTICLES SELECTED | PURCHASE REQUEST | REQUEST STATE | ACCEPTANCE RESULT | | END | ? |

⦿ REQUESTER ○ EXPENSE PAYER    ⦿ REQUESTER ○ APPROVER

SECTION CODE : 1488    NAME CODE : 29611

DATE OF ACCEPTANCE : 1998 X YEAR : 2 X MONTH : SEARCH

REQUEST NUMBER :

ACCOUNT :    EXPENSE ITEM :    ORDER :

BUDGET CODE :    NUMBER OF ARTICLES TO BE DISPLAYED : 15 ARTICLES

ACCEPTANCE RESULT LIST
0 ARTICLES ARE PRESENT IN DATABASE

| INSTALL-MENT DELIVERY | REQUEST NUMBER ▲ | ORDER NUMBER ▲ | COMPLE-TION OF ORDER | REQUES-TER NAME ▲ | MAKER | ARTICLE NAME | TYPE | MERCHAN-DISE CODE | REQUEST-ER | PAYER | AC-COUNT | EXPENSE ITEM | ORDER .... |

NO DATA

TO DISPLAY DETAILS, CLICK "ORDER NUMBER"

PURCHASE REQUEST SYSTEM  07-01-00

| 0 ARTICLES SELECTED | PURCHASE REQUEST | REQUEST STATE | ACCEPTANCE RESULT | APPROVAL PROCESSING | TEMPORARY WORKER MANAGEMENT | END | ? |

APPROVAL REQUEST LIST

NUMBER OF REQUESTS TO BE DISPLAYED IN LIST : [15 REQUESTS ▼]  [RE-LOAD]

ONE REQUEST IS PRESENT IN DATABASE. THIS REQUEST IS DISPLAYED.

APPROVAL REQUEST STATE  [SELECT APPROVAL]  [SELECT REJECTION]
(SELECT DATA AND CLICK "SELECT APPROVAL" OR "SELECT REJECTION" BUTTON. TO DISPLAY DETAILS, CLICK "REQUEST NUMBER". A PLURALITY OF REQUESTS CAN BE SELECTED)

| SELECT | MESSAGE | REQUEST NUMBER | REQUESTER | REQUESTER NAME | ARTICLE NAME | REQUEST QUANTITY | ¥ |
|---|---|---|---|---|---|---|---|
| ☑ | | A8000212 | 1488 | TARO YAMAMOTO | PERSONAL COMPUTER | 10PC | |

PURCHASE REQUEST SYSTEM    08-01-00

| PURCHASE REQUEST | REQUEST STATE | ACCEPTANCE RESULT | APPROVAL PROCESSING | TEMPORARY WORKER MANAGEMENT | END | ? |

☐ 0 ARTICLES SELECTED

TEMPORARY WORKER LIST

NUMBER OF TEMPORARY WORKERS TO BE DISPLAYED: [15 PERSONS ▼]  [RE-LOAD]

- 15 PERSONS
- 25 PERSONS
- 50 PERSONS
- 100 PERSONS

[REGISTER] [CORRECT] [DELETE]

TWO PERSONS ARE PRESENT IN DATABASE. 1 TO 2 OUT OF THEM ARE DISPLAYED.

| SELECT | TEMPORARY WORKER CODE | TEMPORARY WORKER NAME | STAFFING AGENCY NAME | SECTION NAME | BUSINESS OFFICE | REGISTER NAME CODE |
|---|---|---|---|---|---|---|
| ○ | A0001 | XXXX XXXX | XXXXXXXX XXXXXXXX | XXXXXXXXXXXX XXXXXXXXXXX XXXXXXX XXXXXX XXXXXXXXXX XXXXXX | TOKYO | 26375 |
| ○ | A0002 | XXXX XXXX | XXXXXXXX XXXXXXXX | XXXXXXXXXXXX XXXXXXXXXXX XXXXXXX XXXXXX XXXXXXXXXX XXXXXX | TOKYO | 26376 |

FIG. 28

TEMPORARY WORKER REGISTER

REGISTRANT NAME CODE : 29611  REGISTRANT NAME : ICHIRO YAMADA 08-02-01

TEMPORARY WORKER CODE :

TEMPORARY WORKER NAME :

TEMPORARY WORKER NAME (PHONETIC TRANSCRIPTION) :

SECTION CODE : 1488

CANCEL  OK

DATE OF BIRTH : 1965 YEAR 10 MONTH 26 DAY

STAFFING COMPANY : PERSONNEL SERVICE ▶

INPUT ANOTHER CHOICE

BUSINESS OFFICE : TOKYO ▶

FIG. 29

TEMPORARY WORKER REGISTER

08-02-03

REGISTRANT NAME CODE : 26375   REGISTRANT NAME : ICHIRO YAMADA

TEMPORARY WORKER CODE : A0001

TEMPORARY WORKER NAME : TARO JOHO

TEMPORARY WORKER NAME (PHONETIC TRANSCRIPTION) :

SECTION CODE : 1488

DATE OF BIRTH : 1965 YEAR  10 MONTH  26 DAY

[INPUT ANOTHER CHOICE]

STAFFING COMPANY : [PERSONNEL SERVICE ▶]

BUSINESS OFFICE : [TOKYO ▶]

[CANCEL] [OK]

PURCHASE REQUEST APPARATUS AND SYSTEM

BACKGROUND OF THE INVENTION

The present invention relates to a purchase request system for requesting purchase of articles.

Conventionally, companies and business offices purchase various articles necessary for daily business operations from external suppliers.

There are a variety of articles to be purchased. However, for example, purchases of articles such as stationery, for which purchase requests are issued in units of sections, are generally made according to the following procedure and get behind in office automation and paperless transactions.

A general clerk or the like issues a purchase slip for specifying a desired article. Next, a manager approves the issued slip by, e.g., sealing (signature). The approved slip is handed over to the procurement department. The procurement department puts a plurality of orders into a lot as needed, newly issues a purchase order slip, and sends it to an external supplier. With this procedure, the desired articles are delivered.

For this reason, demand has also arisen for paperless transactions for purchase of a variety of articles. A relatively large business office already has an existing terminal group generally connected to a communication network. Effective use of the terminal group is required from the viewpoint of utilization of assets of the company.

SUMMARY OF THE INVENTION

It is an object of the present invention to provide a purchase request system capable of abolishing the conventional business procedures including preparation, issue, and transfer of physical purchase slips and efficiently purchasing a variety of articles using an existing terminal group.

In order to achieve the above object, a purchase request system according to the present invention has the following arrangement.

There is provided a purchase request system including a plurality of terminals capable of requesting purchase of a desired article, characterized by comprising input means for inputting identification information of a user, determination means for determining the identification information input by the input means on the basis of information associated with the user, which is prepared in advance, and display means for selecting, on the basis of a determination result of the determination means, one of a first window capable of inputting a purchase request of the desired article and a second window capable of inputting at least approval or rejection for the purchase request and displaying the selected window.

For example, a user who can decide approval or rejection is identifiably associated, on the basis of the identification information of the user, with the information associated with the user, and when the determination means determines that the input identification information represents the user who can decide approval or rejection, the display means displays the second window.

In order to achieve the above object, another purchase request system according to the present invention has the following arrangement.

There is provided a purchase request system including a plurality of terminals capable of requesting purchase of a desired article, characterized by comprising a terminal capable of inputting information associated with a desired article to request purchase of the article, and communication means for transmitting electronic mail to a user who can decide approval or rejection for purchase of the article in accordance with determination of the input information associated with the article in the terminal.

There is also provided a purchase request system including a plurality of terminals capable of requesting purchase of a desired article, characterized by comprising a terminal capable of inputting approval or rejection for a purchase request of the desired article, and communication means for transmitting electronic mail to a user who has requested purchase of the article in accordance with determination of approval or rejection for purchase of the article in the terminal.

There is also provided a purchase request system including a plurality of terminals capable of requesting purchase of a desired article, characterized by comprising display means for displaying, on the terminal, a software button for opening a first window capable of inputting a purchase request of the desired article and a software button for opening a second window capable of inputting request quantities of a plurality of kinds of articles for which purchase requests are input in the first window.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a view showing a login window in the purchase request system according to the embodiment of the present invention;

FIG. 10 is a view showing a user information registration/change window in the purchase request system according to the embodiment of the present invention;

FIG. 11 is a view showing a request state display window in the purchase request system according to the embodiment of the present invention;

FIG. 12 is a view showing the dialogue box for designating search conditions and display form in the request state display window;

FIG. 15 is a view showing the catalog list window of the purchase request processing function of the purchase request system according to the embodiment of the present invention;

FIG. 16 is a view showing the individual input window of the purchase request processing function of the purchase request system according to the embodiment of the present invention;

FIG. 17 is a view showing the requested article selection list window of the purchase request processing function of the purchase request system according to the embodiment of the present invention;

FIG. 18 is a view showing the detail information input window for a many-item request of the purchase request processing function of the purchase request system according to the embodiment of the present invention;

FIG. 19 is a view showing a state wherein the approval request window for a many-item request is displayed together with the detail information input window by the approval request processing function of the purchase request system according to the embodiment of the present invention;

FIG. 20 is a view showing a state wherein the approval request window for a one-item request is displayed together with the detail information input window by the approval request processing function of the purchase request system according to the embodiment of the present invention;

FIG. 21 is a view showing conditions of cross-check executed by a client in inputting data to the detail information input window in the purchase request system according to the embodiment of the present invention;

FIG. 23 is a view showing the acceptance result list window displayed by the acceptance result display function in the purchase request system according to the embodiment of the present invention;

FIG. 24 is a view showing the approval request list window displayed by the approval processing function in the purchase request system according to the embodiment of the present invention;

FIG. 27 is a view showing the temporary worker list window of the temporary worker management function in the purchase request system according to the embodiment of the present invention;

FIG. 28 is a view showing the temporary worker registration window of the temporary worker management function in the purchase request system according to the embodiment of the present invention;

FIG. 29 is a view showing the temporary worker deletion window of the temporary worker management function in the purchase request system according to the embodiment of the present invention;

DETAILED DESCRIPTION OF THE PREFERRED EMBODIMENTS

An embodiment of the present invention will be described below in detail with reference to the accompanying drawings.

[Hardware Configuration of System]

The overall hardware configuration of a purchase request system of this embodiment will be described first.

Figure 1:
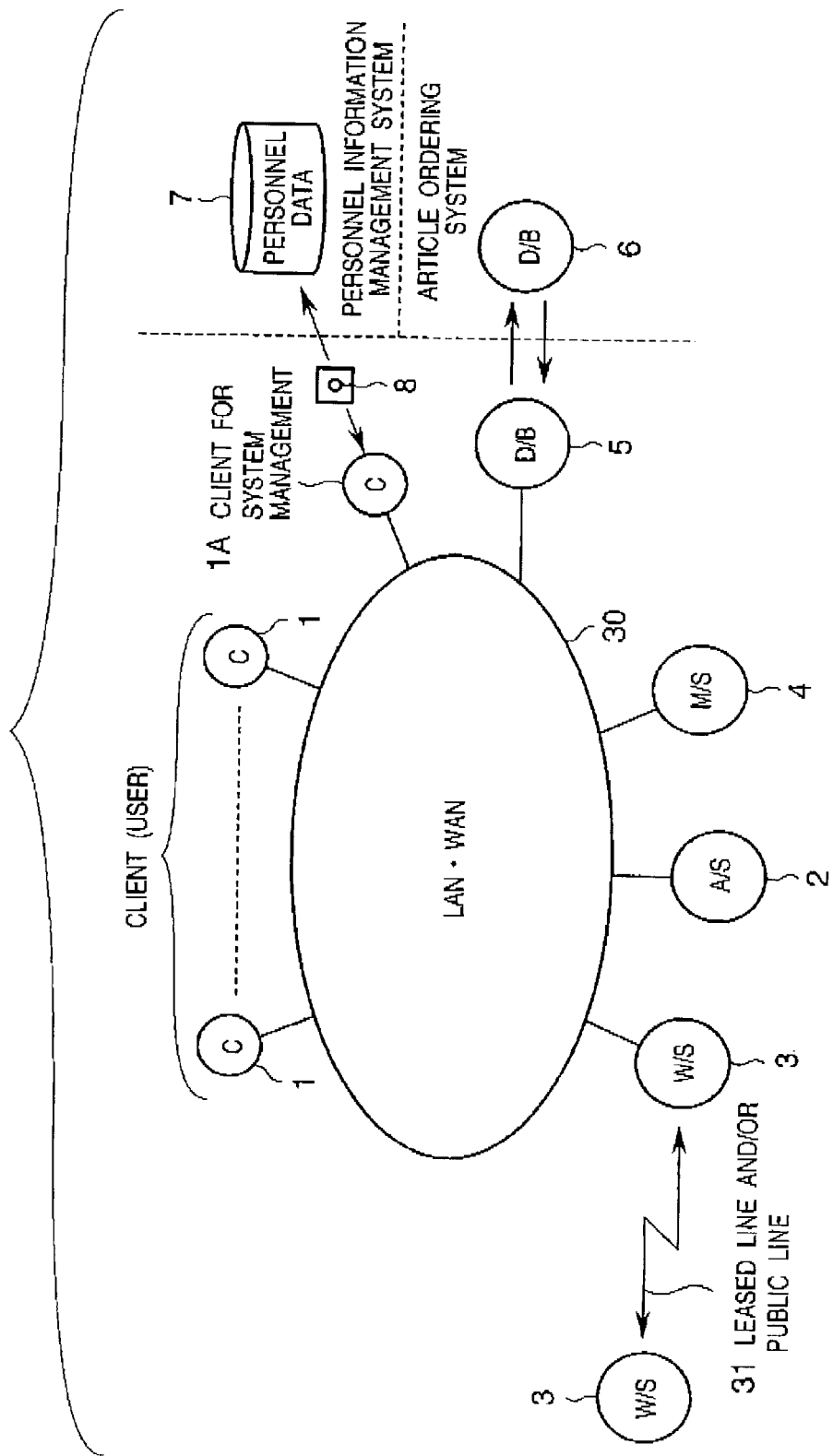
FIG. 1 is a view showing the overall arrangement of a purchase request system according to an embodiment of the present invention.

FIG. 1 is a view showing the overall arrangement of the purchase request system according to the embodiment of the present invention.

Referring to FIG. 1, reference numeral 30 denotes a communication line as a LAN (Local Area Network) or WAN (Wide Area Network); 1, a plurality of client computers (to be referred to as clients hereinafter); 1A, a client for a system manager for maintaining and managing the system; and 2, an application server computer (to be referred to as an A/S hereinafter) for realizing a purchase request function (to be described later) and the like.

A Web server computer (to be referred to as a W/S hereinafter) 3 provides a so-called intranet environment in accordance with general software for realizing, e.g., the WWW (World Wide Web) function in a client-server system constituted by the plurality of clients 1 (including the client 1A) and A/S 2. A mail server computer (to be referred to as an M/S hereinafter) 4 controls/manages electronic mail transmission/reception between the clients in accordance with general mail management function (mailer) software. A database (D/B) 5 systematically stores various data associated with the purchase request system on the communication line 30.

Personnel data 7 is used in this purchase request system, which is included in various personnel data stored by an external system (to be referred to as a personnel information management system hereinafter) for systematically managing the personnel information of a company to which the users of the clients 1 and 1A belong. The personnel data 7 correlates at least the names, employee numbers, and positions of employees with each other in advance. The system manager for maintaining and managing the client 1A copies the personnel data 7 as identification (ID) information of users (employees) who can use the purchase request function (to be described later) in the clients 1 to a portable storage medium 8 such as a floppy disk and downloads the copy data from, e.g., the client 1A to the D/B 5.

The storage medium 8 is used to copy the personnel data 7 because a number of personal information of the employees are generally stored in the personnel information management system. As far as a sufficient security guarantee function can be realized between the personnel data 7 and the purchase request system, the personnel data 7 may be downloaded through the communication line periodically and/or irregularly, or the master information of the personnel data 7 in the personnel information management system may be accessed when each client 1 logs in to the A/S 2.

In this purchase request system, a plurality of W/Ss 3 are connected through a leased line and/or public line 31. With this arrangement, the same intranet environment as that for the clients 1 can be provided to clients connected to a communication line (not shown; LAN or WAN) in another business office.

Data associated with articles to be purchased, which is stored in the D/B 5 by the purchase request function (to be described later), is appropriately updated between the D/B 5 and a database 6 prepared in another system used to actually order the articles to external suppliers. The database 6 is included in, e.g., an article ordering system managed and used by the procurement department in the company (business office). On the basis of the data of articles to be purchased, which is reflected to the database 6, the article ordering system puts an article whose purchase quantity is large into a desired lot and actually orders the article to an external supplier. To actually order an article, the general EDI (Electronic Data Interchange) function is used, or an actual slip is issued as needed. A detailed description thereof will be omitted in this application. The purchase request system may incorporate the function of the article ordering system.

If the company (business office) has no procurement department, and individual users who have requested to purchase articles can manage the article order, articles for which purchase is approved by approval processing (to be described later) may be directly ordered by the purchase request system.

In this embodiment, the purchase request system is realized on the intranet shown in FIG. 1. However, the present invention is not limited to this. If security of data to be transmitted/received can be ensured, the communication line 30 may be connected to a so-called Internet provider in place of some W/Ss 3 to allow a personal computer at a remote site as the client 1.

Figure 2:
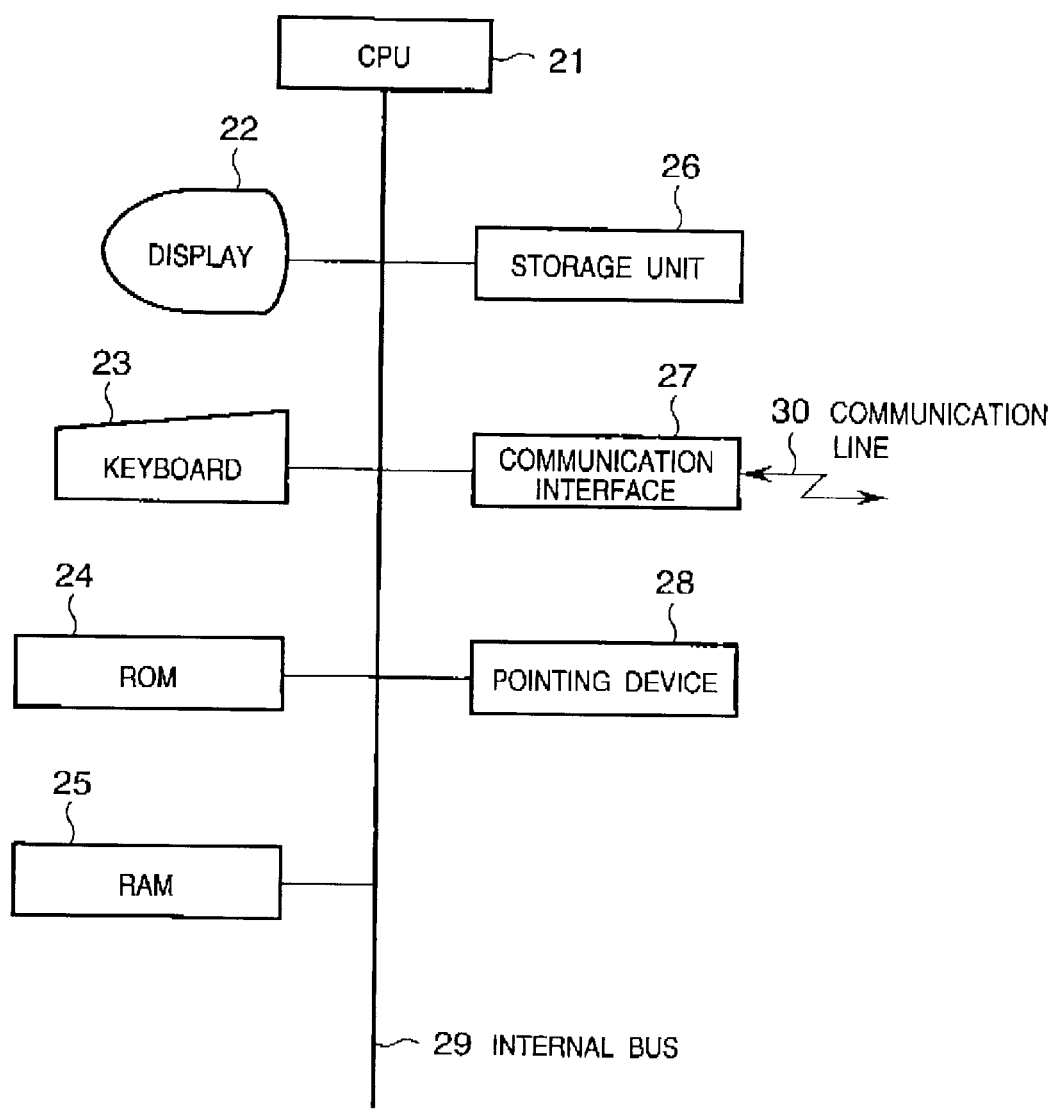
FIG. 2 is a block diagram of a personal computer which can be used as a client computer in the embodiment of the present invention.

FIG. 2 is a block diagram of a personal computer which can be used as a client computer in the embodiment of the present invention. The client computer corresponds to the client 1 (1A) shown in FIG. 1.

Referring to FIG. 2, reference numeral 22 denotes a display 22 such as a CRT; 23, a keyboard as an input means; 24, a ROM which stores a boot program and the like; and 25, a RAM for temporarily storing various processing results. A storage unit 26 such as a hard disk drive (HDD) stores a general browser program that realizes access to a site (information resource) of a desired URL (Uniform Resource Locator) and browsing and/or acquisition of information of the accessed site. A communication interface 27 communicates with external apparatuses such as the above-described servers through the communication line 30 (LAN or WAN) in accordance with a protocol such as the TCP/IP (Transmission Control Protocol/Internet Protocol) or HTTP (HyperText Transfer Protocol) as an upper layer of TCP/IP.

Reference numeral 28 denotes a pointing device such as a mouse. These units are connected via an internal bus 29. A CPU 21 controls the entire client computer 1 (1A) in accordance with the program stored in the storage unit 26.

For each of the server computers such as the A/S 2, W/Ss 3, and M/S 4 as well, the display 22, keyboard 23, and pointing device 28 are prepared as needed. The basic hardware configuration of each server is substantially the same as that of the block diagram in FIG. 2. However, when accurate data processing by the servers and restoration of stored data are taken into consideration, hardware that duplicates the CPU 21 and storage unit 26 is employed. In this embodiment, separate servers are used in accordance with the function realized by each server. However, the present invention is not limited to this. As long as the data processing capability is sufficient, for example, the A/S 2 and M/S 4 may be realized by single hardware.

[Software Configuration of System]

The purchase request function realized by the system of the above-described embodiment will be described next. In the following description, the user (e.g., a general clerk) of the client 1 for requesting to purchase an article is called a "requester", and the user (e.g., a manager with a rank equal to or higher than a section manager) of the client 1 for determining approval or rejection of the purchase request for the article is called an "approver".

The purchase request system according to this embodiment will be briefly described. This system has a function with which the requester specifies (selects) a desired article prior to actual order of the article to be purchased by the external article ordering system shown in FIG. 1, a function as a purchase request apparatus for requesting the approver to approve purchase of the specified article, and a function as a purchase request approving apparatus with which the approver determines approval or rejection of purchase of the approval-requested article in a client-server environment where a plurality of clients are connected on a communication network (details will be described later). A user logs in to this system as a requester or approver in accordance with the user (employee) ID from a predetermined Web page displayed on the client 1. When the user logs in as an approver, he/she can also use the article specifying function and approval request function. This arrangement allows abolition of the conventional business procedures including preparation, issue, and transfer of physical purchase slips and office automation (OA) in purchasing various articles to be used in business offices.

These functions are realized when the A/S 2 executes the module group of software constructing the system shown in FIGS. 3 to 5 and stored in the A/S 2 in advance, and the client 1 executes the software shown in the flow chart of FIG. 30 as basic software for displaying windows (to be described later) shown in FIGS. 9 to 29 on the display 22 of the client 1. Each client 1 and A/S 2 communicate using the above-described intranet environment by the W/Ss 3.

The purchase request system uses an automatic mail function provided by the above-described M/S 4 when the requester notifies the approver of an approval request (FIG. 7) or the approver notifies the requester of an approval result (FIG. 8) (details will be described later).

<Software Executed in Client 1>

Software executed in the client 1 will be described.

Figure 30:
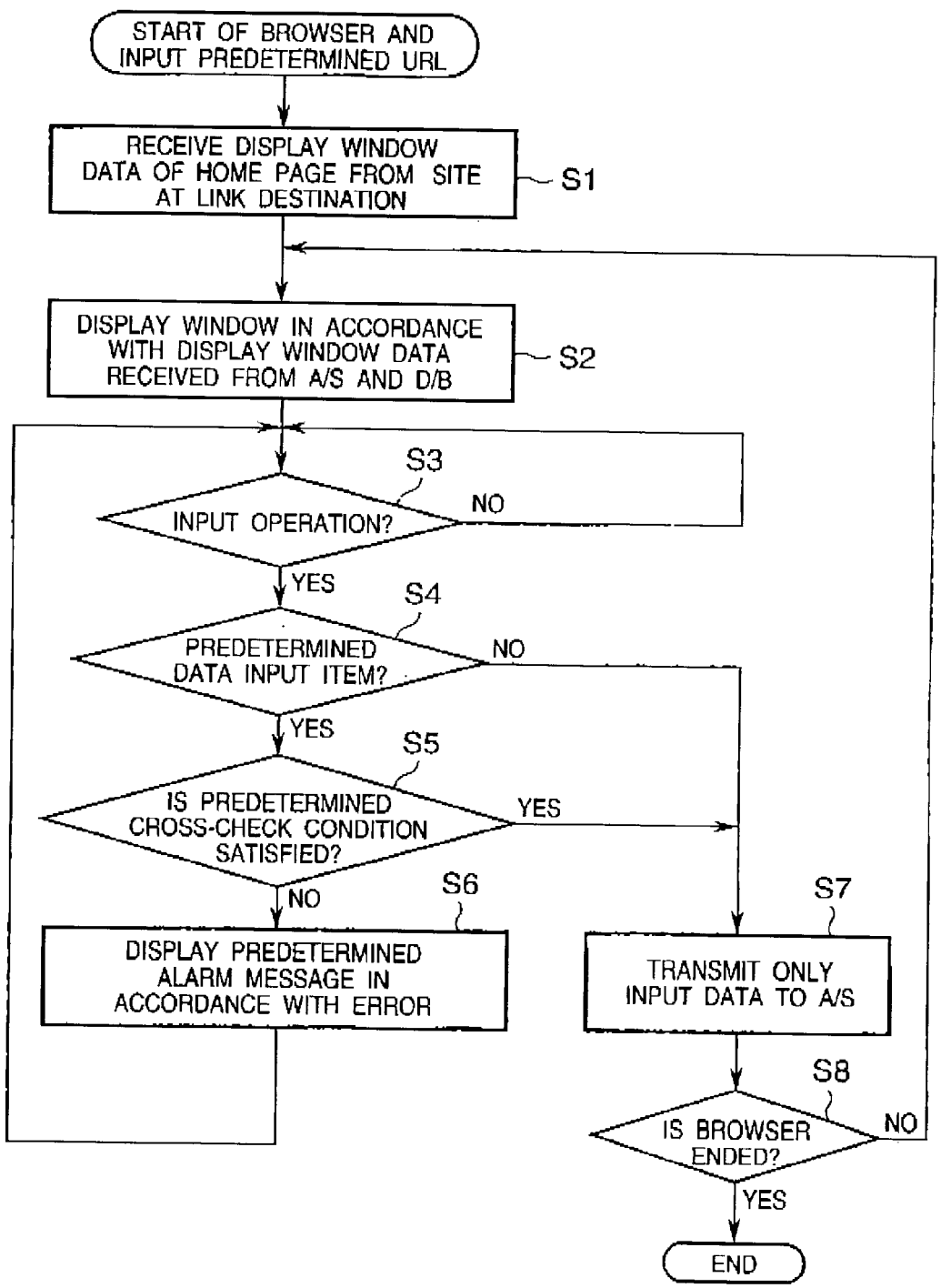
FIG. 30 is a flow chart of software executed by each client in the purchase request system according to the embodiment of the present invention.

FIG. 30 is a flow chart of software executed by each client in the purchase request system according to the embodiment of the present invention. In this case, a user logs in to the purchase request system as a requester.

The storage unit 26 of the client 1 stores a browser program in advance, as described above. First, the user of the client 1, who will log in to the purchase request system as a requester, starts the browser in accordance with a predetermined procedure so as to make the client of his/her own link to the purchase request system executed by the CPU of the A/S 2 (more specifically, the browser program in the storage unit 26 is loaded in the RAM 25, and the CPU 21 executes the loaded program). Simultaneously, the user inputs predetermined URL to a predetermined area of the started browser. When the client is linked to the purchase request system through the W/S 3, the CPU 21 of the client 1 starts processing from step S1.

In this embodiment, the program of the cross-check function from step S3 to step S5 is directly described in the file of a Web page described in the HTML as a tag of the JavaScript. The cross-check function can be executed by each client 1. When the A/S 2 executes the cross-check function, transmission of data input from keys and transmission of data representing that the transmitted data is inappropriate are necessary as communication between the client 1 and A/S 2. However, when the cross-check function is executed by the client 1, the transmission can be omitted, and therefore, the waiting time of the user of the client 1 can be made shorter than that when the A/S 2 executes the cross-check function.

Since the program of the cross-check function is described as a tag of the JavaScript, every time a Web page described in the HTML is displayed, the client 1 can acquire the program of the cross-check function from the A/S 2 together with data (to be referred to as display window data hereinafter) representing the layout of the displayed window. In addition, a program of old version can be prevented from remaining in the storage unit 26 of the client 1. This arrangement facilitates systematic management of the program of the cross-check function in the A/S 2.

Step S1: The RAM 25 receives the display window data of a home page (HP) and the like from the site (A/S 2) at the link destination through the communication interface 27. In this embodiment, the general HTML (HyperText Markup Language) is employed as the description language of a Web page.

Step S2: A window is displayed on the display 22 in accordance with the display window data received from the A/S 2 and D/B 5 and data embedded in the display window.

Step S3: It is detected whether key input of a numerical value or the like from the keyboard 23 or pointing operation using the pointing device 28 is performed.

Step S4: If YES in step S3 (the input operation is detected), it is determined whether a predetermined data input item is input in the window displayed on the display 22. If NO in step S4 (no predetermined data input item is input), the flow advances to step S7.

Step S5: If YES in step S4 (the predetermined data input item is input), it is determined whether the input data detected in step S3 satisfies a predetermined cross-check condition. If YES in step S5, the flow advances to step S7.

Specific examples of the predetermined data input item and predetermined cross-check condition will be described later with reference to FIGS. 20 and 21.

Step S6: If NO in step S5 (the condition is not satisfied), a predetermined alarm message is displayed on the display 22 in accordance with the determination result (error) in step S5, and the flow returns to step S3.

Step S7: The input data detected in step S3 or data corresponding to the pointing operation is transmitted to the A/S 2 via the communication interface 27.

Step S8: It is determined whether a predetermined input operation for instructing to end the browser is performed. If NO in step S8 (no end instruction is input), the flow returns to step S2. If YES in step S8 (the end instruction is input), the browser program is ended, and the area of the RAM 25 where the program has resided is released.

In this embodiment, the program of the cross-check function is described as a tag of the JavaScript. If the system environment allows easy version management of programs stored in the storage unit 26 of each client 1, the program of the cross-check function which is compiled to the execution form in advance may be stored in the A/S 2. When a Web page described in the HTML is to be displayed on the client 1 for the first time, the program in the execution form may be downloaded to the client 1 in accordance with the tag of the Java applet contained in the file in advance.

<Software Executed by A/S 2>

Software executed by the CPU of the A/S 2 will be described next. First, the outline of the module group of the software constructing the system shown in FIGS. 3 to 5 will be described with reference to the flow charts shown in FIGS. 31 and 32. Next, window display processing common to the modules will be described with reference to the flow chart shown in FIG. 32. Finally, the functions of the modules shown in FIGS. 3 to 5 will be described with reference to windows shown in FIGS. 9 to 29 (including FIGS. 7 and 8).

(1) Outline of Software Module Group of A/S 2

Figure 3:
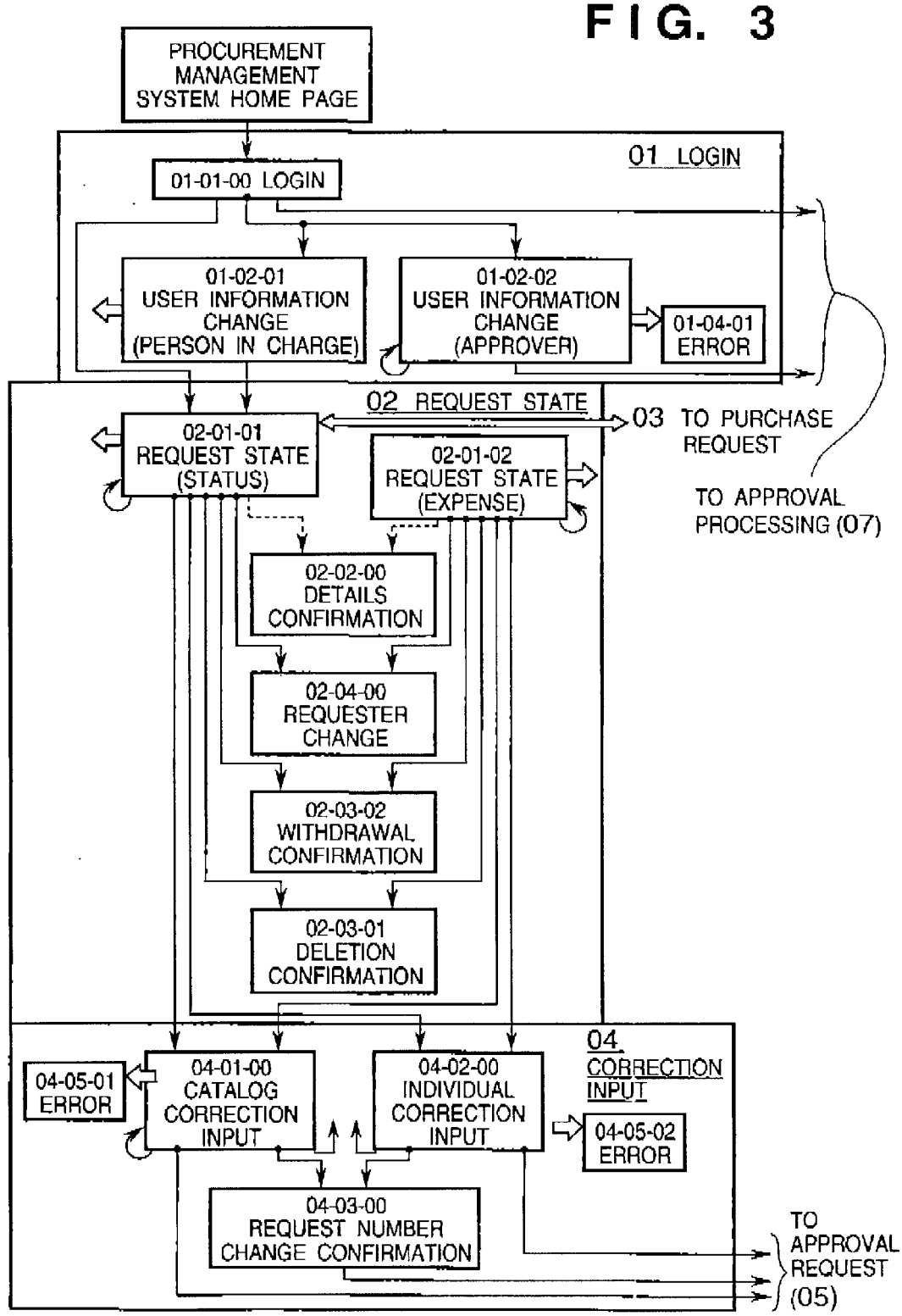
FIG. 3 is a view showing the system configuration of software executed by the A/S of the purchase request system according to the embodiment of the present invention.
Figure 4:
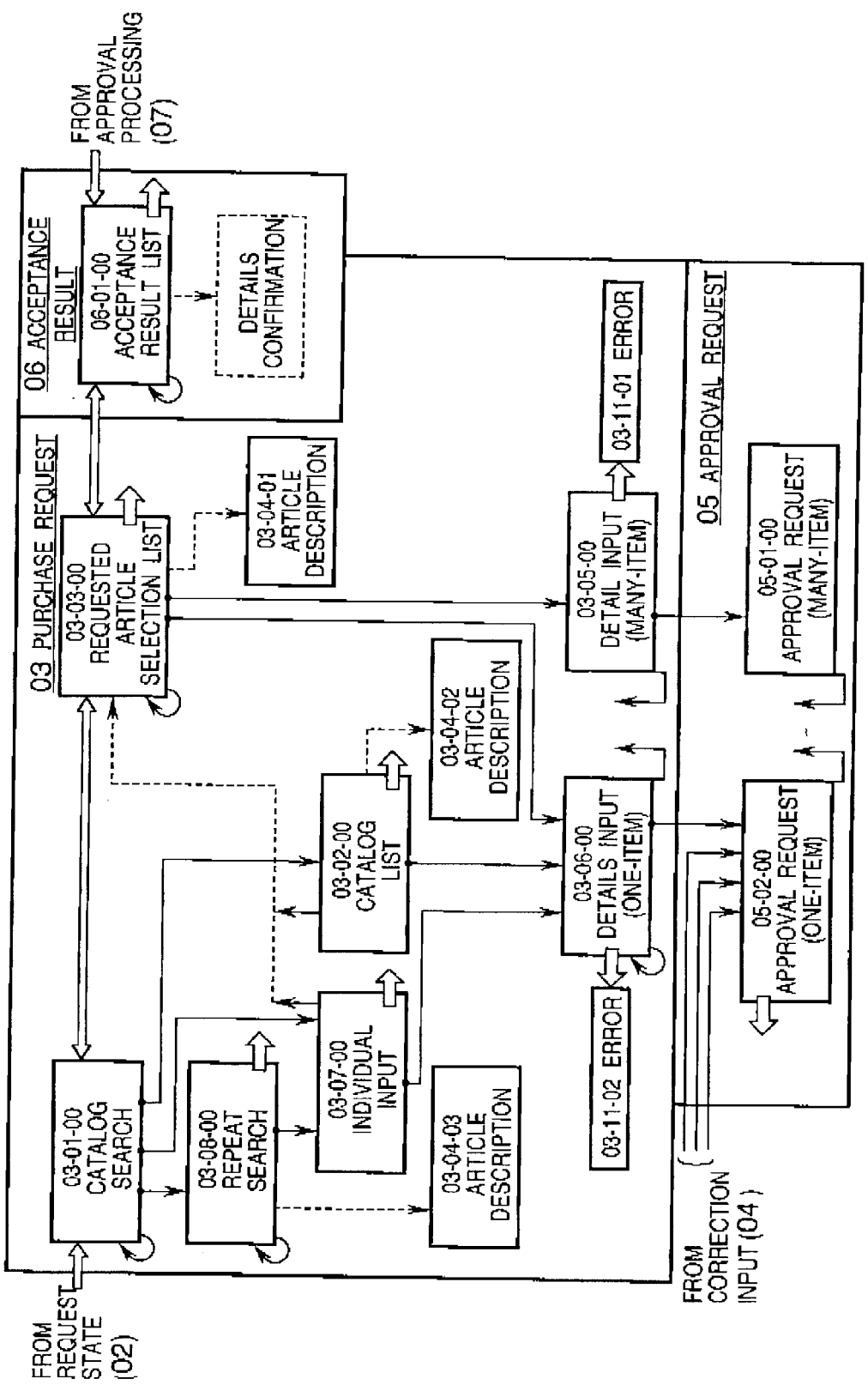
FIG. 4 is a view showing the system configuration of software executed by the A/S of the purchase request system according to the embodiment of the present invention.
Figure 5:
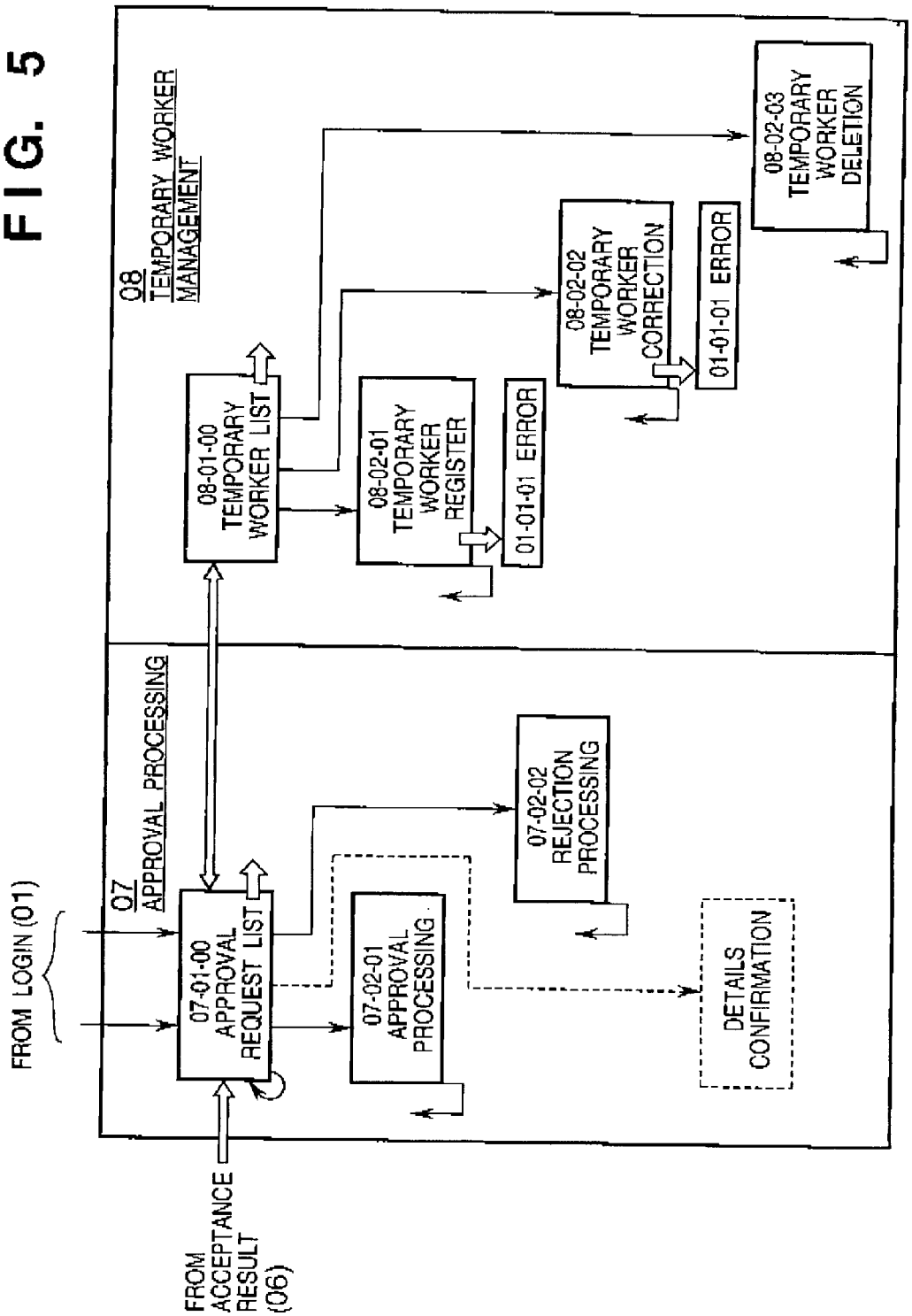
FIG. 5 is a view showing the system configuration of software executed by the A/S of the purchase request system according to the embodiment of the present invention.
Figure 6:
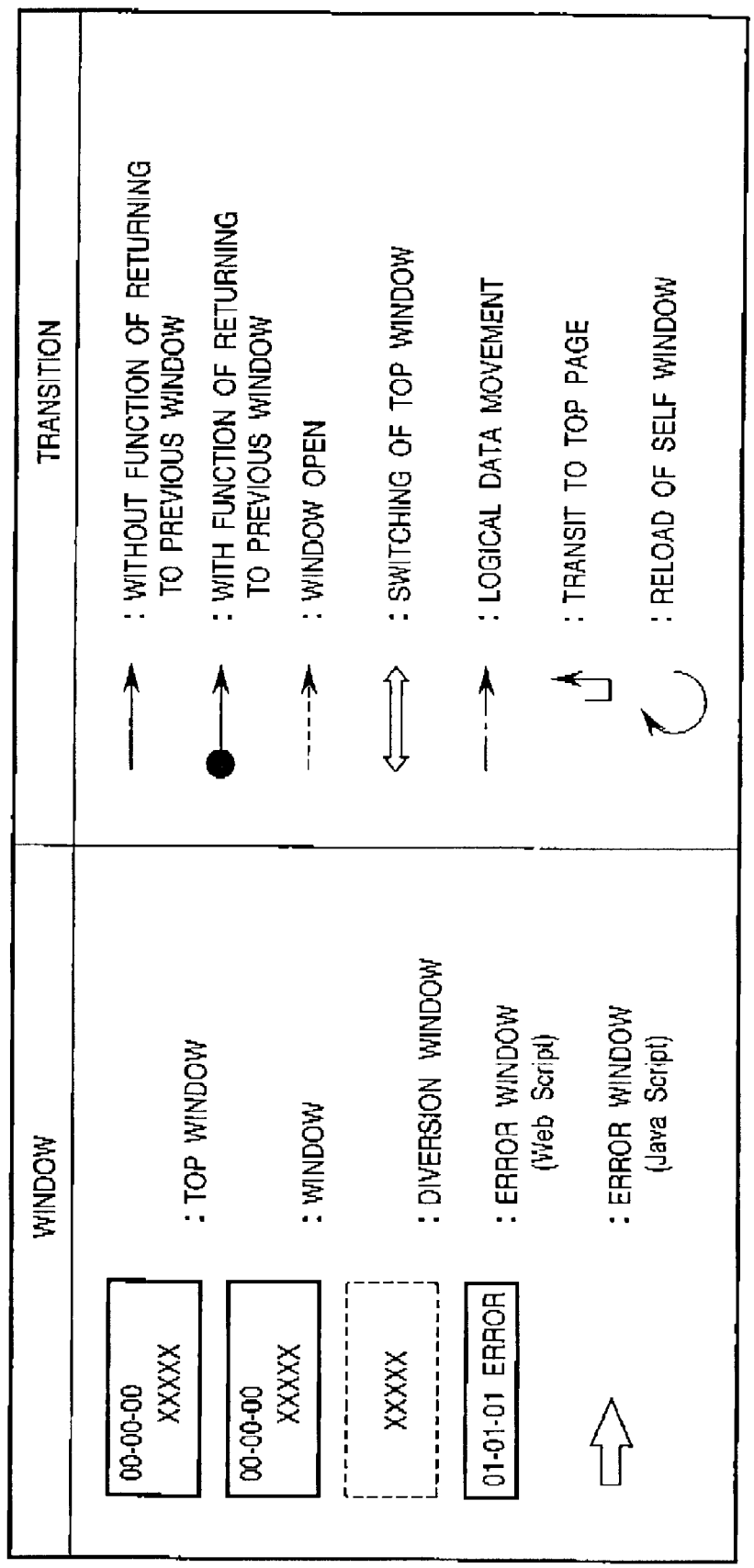
FIG. 6 is a view for explaining symbols used in FIGS. 3 to 5.

FIGS. 3 to 5 are views showing the system configuration of software executed by the A/S of the purchase request system according to the embodiment of the present invention. FIG. 6 is a view for explaining symbols used in FIGS. 3 to 5.

The software module group (to be referred to as modules hereinafter) executed by the A/S 2 comprises eight modules of login (01), request state display processing (02), purchase request processing (03), correction input processing (04), approval request processing (05), acceptance result display processing (06), approval processing (07), and temporary worker management processing (08), as shown in FIGS. 3 to 5. These modules have a function of displaying various windows (to be described later) on the display 22 of the client 1 and realizing an input operation in the displayed window. Transition between the modules and window display in each module can be done as indicated by arrows and broken lines in FIGS. 3 to 5.

A numeral (––**) in each block representing a top window or a window belonging to the top window is a window number. A top window is displayed first when the function to be used by the user of the client 1 is changed by a predetermined operation in the window (to be described later).

Figure 31:
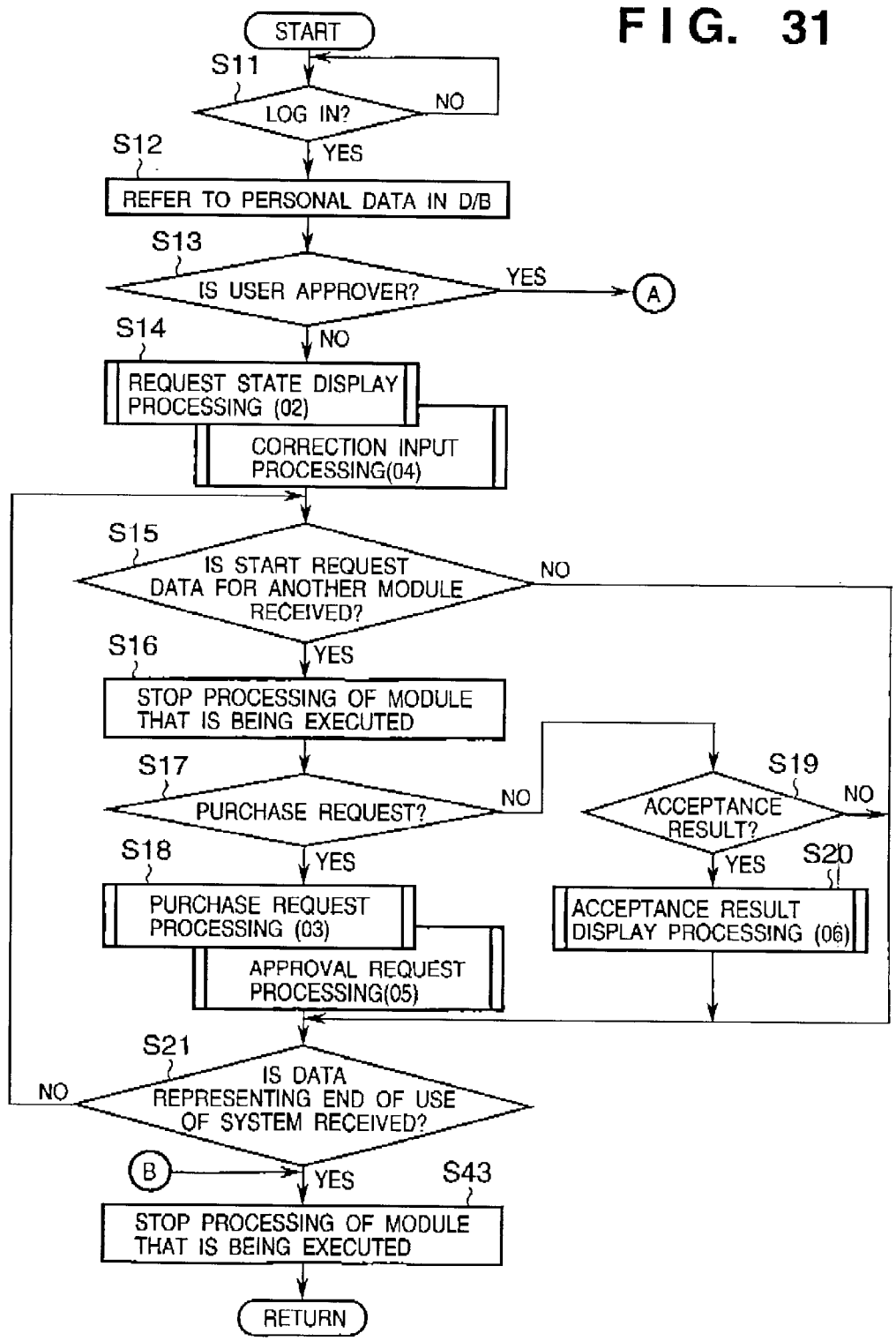
FIG. 31 is a flow chart showing the outline of processing executed by the A/S of the purchase request system according to the embodiment of the present invention.
Figure 32:
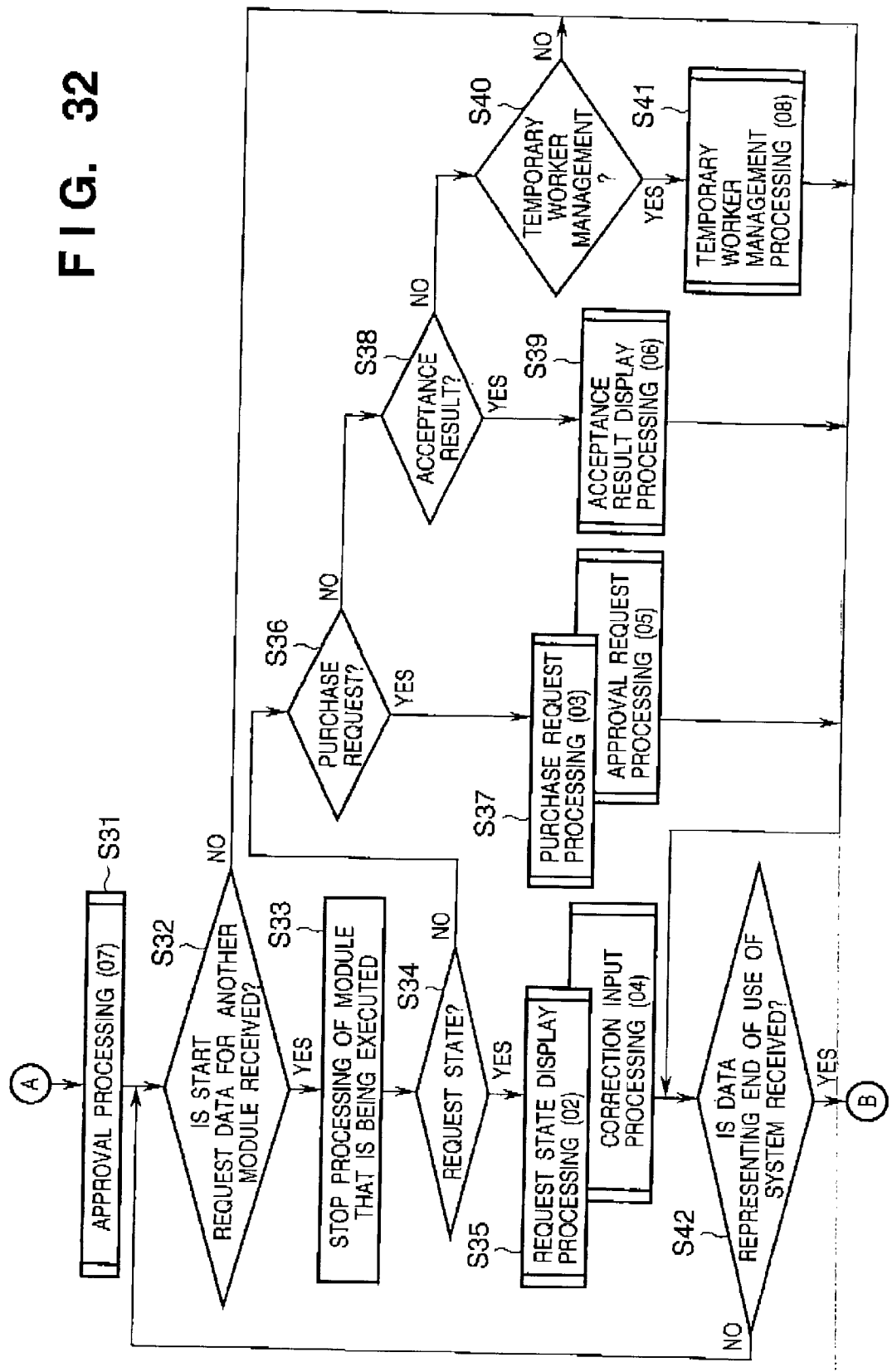
FIG. 32 is a flow chart showing the outline of processing executed by the A/S of the purchase request system according to the embodiment of the present invention.

FIGS. 31 and 32 are flow charts showing the outline of processing executed by the A/S of the purchase request system according to the embodiment of the present invention.

Step S11: It is determined whether the client 1 logs in through the W/S 3. The client 1 logs in from a predetermined HP displayed on the display 22 of the client, as described with reference to FIG. 30.

Steps S12 and S13: When a user ID (including a password from the second login) is received in step S11, the personnel data 7 (including a password group registered in the D/B 5 from the second login) stored in the D/B 5 in advance is referred to (step S12) to determine whether the received user ID is an approver (step S13). If YES in step S13 (the login user is an approver), the flow advances to step S31 in FIG. 32.

Step S14: If NO in step S13 (the login user is a requester), request state display processing (02) is performed. At this time, transition to correction input processing (04) is possible.

Step S15: It is detected whether start request data for another module different from the module that is being currently executed is received from the login client 1 through the W/S 3. If NO (the data is not received), the flow advances to step S21.

Step S16: If YES in step S15 (the start request data is received), processing of the module that is being executed is stopped.

Steps S17 and S18: It is determined whether the start request data received in step S15 represents purchase request processing (step S17). If YES in step S17, purchase request processing is executed (step S18). At this time, transition to approval request processing (05) is possible.

Steps S19 and S20: If NO in step S17, it is determined whether the start request data received in step S15 represents acceptance result display processing (step S19). If YES in step S19, acceptance result display processing is executed (step S20).

Step S21: It is detected whether data representing the end of use of this system is received from the login client 1 via the W/S 3. If NO in step S21 (the data is not received), the flow returns to step S15.

Step S43: If YES in step S21 (the data representing the end of use is received), processing of the module that is being executed is stopped.

Step S31: When it is determined in step S13 that the login user is an approver, approval processing (07) is performed.

Step S32: It is detected whether start request data for another module different from the module that is being currently executed is received from the login client 1 through the W/S 3. If NO (the data is not received), the flow advances to step S42.

Step S33: If YES in step S32 (the start request data is received), processing of the module that is being executed is stopped.

Steps S34 and S35: It is determined whether the start request data received in step S32 represents request state display processing (02) (step S34). If YES in step S34, request state display processing (02) is executed (step S35). At this time, transition to correction input processing (04) is possible.

Steps S36 and S37: If NO in step S34, it is determined whether the start request data received in step S32 represents purchase request processing (03) (step S36). If YES in step S36, purchase request processing (03) is executed (step S37). At this time, transition to approval request processing (05) is possible.

Steps S38 and S39: If NO in step S36, it is determined whether the start request data received in step S32 represents acceptance result display processing (06) (step S38). If YES in step S38, acceptance result display processing (06) is executed (step S39).

Steps S40 and S41: If NO in step S38, it is determined whether the start request data received in step S32 represents temporary worker management processing (08) (step S40). If YES in step S40, temporary worker management processing (08) is executed (step S41). On the other hand, if NO in step S40, the flow returns to step S32.

Step S42: It is detected whether data representing the end of use of this system is received from the login client 1 via the WIS 3. If NO in step S42 (the data is not received), the flow returns to step S32. If YES in step S42 (the data representing the end of use is received), the flow advances to step S43.

(2) Window Display Processing Common to Modules

Figure 33:
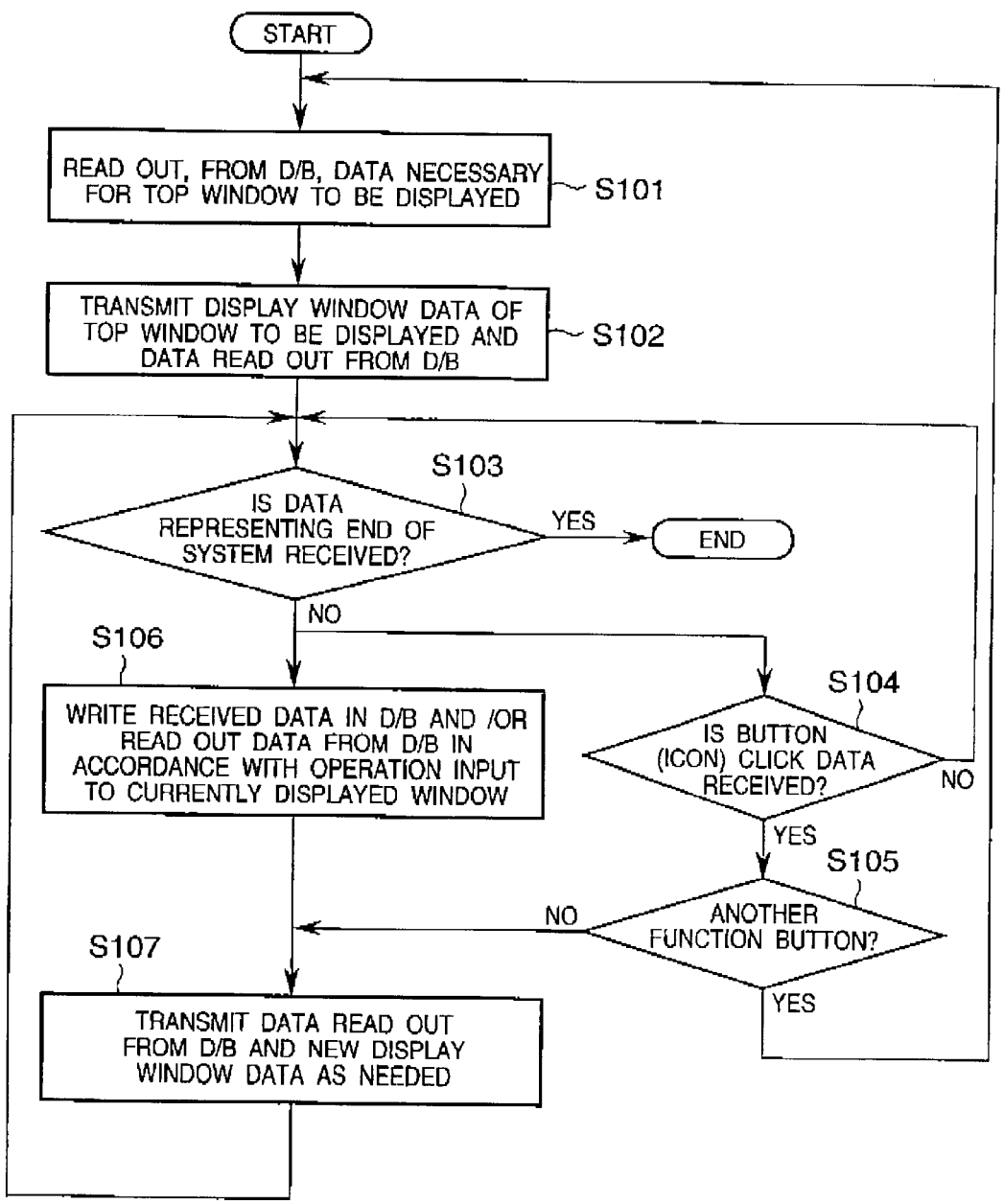
FIG. 33 is a flow chart showing window display processing common to modules executed by the A/S of the purchase request system according to the embodiment of the present invention.

FIG. 33 is a flow chart showing window display processing common to the modules executed by the A/S of the purchase request system according to the embodiment of the present invention. This processing is performed to display a window corresponding to the input operation by the user on the display 22 of the client 1 which is logging in the A/S 2. This processing is started by the CPU of the A/S 2 when the function to be used by the user of the client 1 is changed by a predetermined operation in a window (to be described later).

Step S101: Data of each item necessary in the top window (i.e., top window corresponding to the function designated by a predetermined operation) to be displayed on the client 1 is read out from the D/B 5.

In step S102: The display window data of the top window to be displayed and the data read out from the D/B 5 in step S101 are transmitted to the login client 1 via the W/S 3. Upon receiving the display window data and the like via the communication interface 27, the CPU 21 of the client 1 interprets the received display window data by the browser function which is currently being executed and displays the top window on the display 22 in accordance with the interpretation.

Step S103: It is detected whether data representing the end of use of this system is received. If YES in step S103 (the data is received), processing is stopped.

Step S104: If NO in step S103 (the data is not received), it is determined whether data representing that a software button (to be referred to as a button hereinafter) (including an icon) is depressed (clicked) on the window currently displayed on the client 1 is received through the W/S 3. If NO in step S104 (the data is not received), the flow returns to step S103.

Step S105: If YES in step S103 (the data is received), it is determined whether the button is a button for selecting another function different from the function that can be used by the user on the currently displayed window. If YES in step S105 (another function button is clicked), the flow returns to step S101. If NO in step S105 (another function button is not clicked), the flow advances to step S107.

Step S106: If NO in step S103 (the data is not received), data received via the W/S 3 in accordance with the input operation by the user on the window which is currently being displayed on the client 1 is written (including update) in the D/B 5 and/or new data is read out from the D/B 5.

Step S107: The data read out in step S106 and display window data representing a window for displaying the data are transmitted to the login client 1 via the W/S 3, as needed, and the flow returns to step S103. Upon receiving the display window data and the like, as in step S102, the CPU 21 of the client 1 displays a window belonging to the currently displayed top window or a new window on part of the currently displayed window.

(3) Description of Function of Each Window

The detailed functions of the modules constructing the system shown in FIGS. 3 to 5 will be described below with reference to main windows (FIGS. 9 to 29) which can be displayed on the display 22 of the client 1.

<Login (01) Module>

FIG. 9 is a view showing a login window in the purchase request system according to the embodiment of the present invention.

A login window 01-01-00 shown in FIG. 9 can be opened from a predetermined HP displayed on the client 1 by the above-described procedure (although details will be described later, the login window can be opened even by using the mailer function to be described later with reference to FIGS. 7 and 8).

In this login window, the user inputs predetermined data in the columns of personal name (user ID) and password.

When the "login" button is clicked, the input data are transmitted to the A/S 2. The A/S 2 determines whether the user himself/herself logs in and whether the user is a requester or approver, on the basis of the user ID and password input as described above. In accordance with the determination result, the A/S 2 determines a top window which can transit to another window. When the "reset" button is clicked, input to the columns of personal name and password can be reset (the "reset" buttons in other windows have the same function as described above, and a detailed description thereof will be omitted). When "end" button is clicked, data representing the end of use of this system is transmitted to the A/S 2 (the "end" buttons in other windows have the same function as described above, and a detailed description thereof will be omitted). When the "user information register/change" button is clicked, the window shown in FIG. 10 is displayed.

FIG. 10 is a view showing the user information registration/change window in the purchase request system according to the embodiment of the present invention.

In a user information registration/change window 01-02-01 (when the user is a requester) shown in FIG. 10, a change in password, e-mail address, and extension number in the business office are input. The e-mail address is input to realize approval request notification from the requester to the approver (FIG. 7) and approval result notification from the approver to the requester (FIG. 8) (both will be described later). The user who has completely input these items in this window clicks the "register/update" button (the "register/update" buttons in other windows have the same function as described above, and a detailed description thereof will be omitted). The input data are transmitted to the A/S 2. When "return" button is clicked, a window as an upper layer of the currently displayed window is displayed (the "return" buttons in other windows have the same function as described above, and a detailed description thereof will be omitted). In this case, the login window 01-01-00 in FIG. 9 is displayed again.

The dialogue box on the lower side of the broken line in the window shown in FIG. 10 is displayed to set a target approval section only when the login user is an approver. In this case, the window number is 01-02-02. In this dialogue box, the login user as an approver can change (add or delete) by himself/herself the sections (groups of requesters) in his/her charge in approving purchase requests. More specifically, to add a target section, the approver inputs the code of the section to the column of post code and clicks the "register" button. To delete a target section, he/she selects the section to be deleted from the list of current target sections and clicks the "delete" button. With this function, an approver can temporarily approve purchase requests from a section not in his/her charge by proxy for the original approver of the section due to some reason, so a more practical system can be realized.

<Request State Display Processing Module (02) and Correction Input Processing Module (04)>

FIG. 11 is a view showing a request state display window in the purchase request system according to the embodiment of the present invention. This window is displayed first after login is complete when the user is a requester. FIG. 12 is a view showing the dialogue box for designating search conditions and display form in the request state display window.

In a request state display window 02-01-01, the list of article purchase request statuses is displayed in accordance with conditions designated in the dialogue box for designating the search conditions and display form shown in FIG. 12. The displayed data are data read out from the D/B 5.

Buttons at the upper portion of the request state display window 02-01-01 shown in FIG. 11 will be described.

Figure 13:
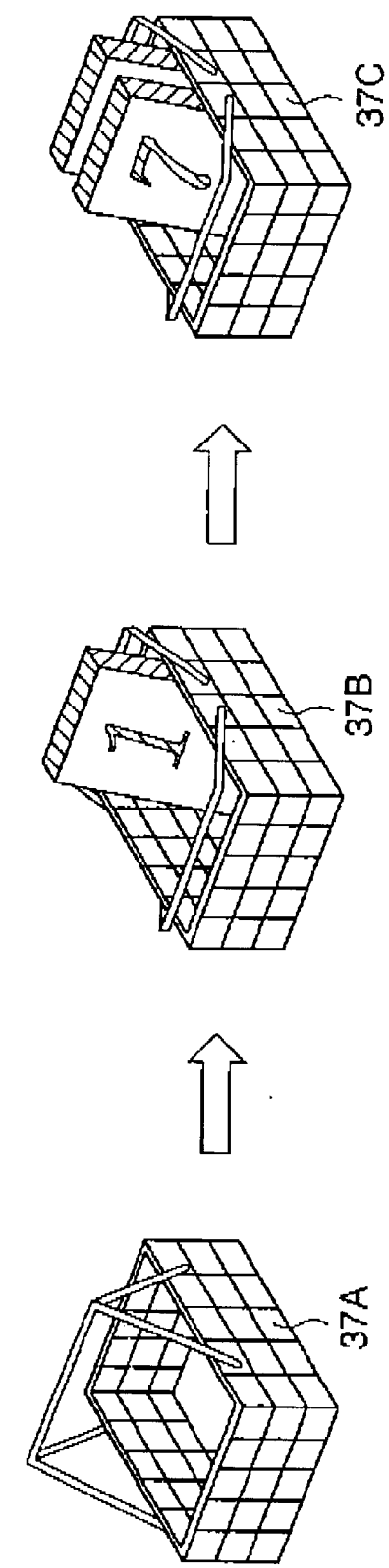
FIG. 13 is a view showing icon images indicating the number of purchase-requested articles in the embodiment of the present invention.

On the "n articles selected" button, the number (number of types) of articles purchase-requested by the purchase request function realized by the purchase request processing module (03) (to be described later) is displayed. When this button is clicked, a requested article selection list window 03-03-00 shown in FIG. 17 is displayed to set the purchase quantity of the n articles. The "n articles selected" button may have a shape of, e.g., a shopping basket as shown in FIG. 13, on which the number of purchase-requested articles is displayed.

Figure 14:
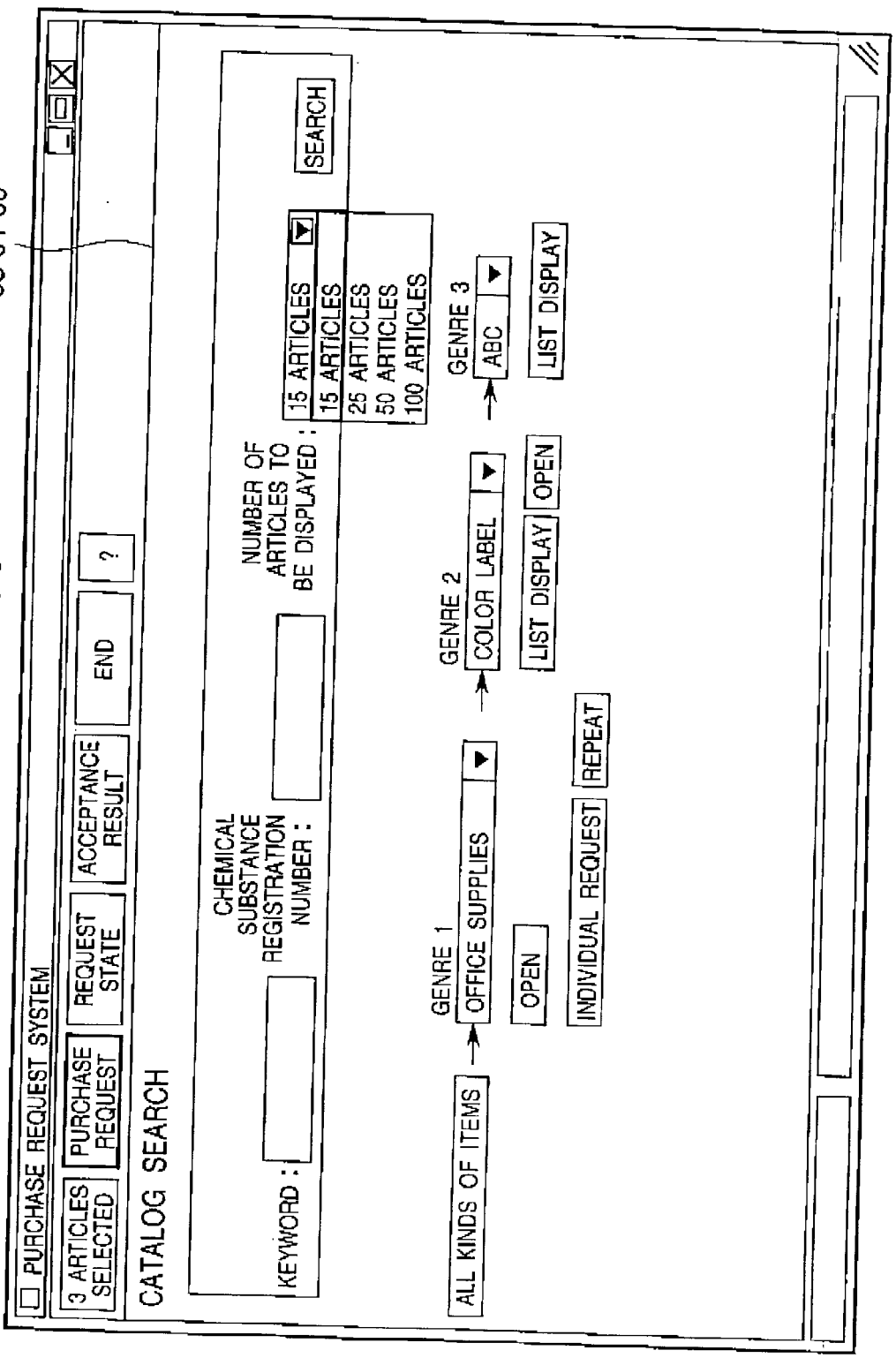
FIG. 14 is a view showing the catalog search window of the purchase request processing function of the purchase request system according to the embodiment of the present invention.

When the "purchase request" button is clicked, a catalog search window 03-01-00 shown in FIG. 14, which is realized by the purchase request processing module (03), is displayed.

When the "acceptance result" button is clicked, an acceptance result list window 06-01-00 shown in FIG. 23, which is realized by the acceptance result display processing (06), is displayed.

When the "?" button at the upper portion of the request state display window 02-01-01 is clicked, to display text data for explaining the function, which is stored in the D/B 5 in advance, a program for transmitting the data to the client 1 is executed by the A/S 2 (the "?" buttons in other windows have the same function as described above, and a detailed description thereof will be omitted).

The plurality of buttons in the upper region of the above-described window or another window to be described below are actually displayed with any one of the buttons kept clicked in accordance with the displayed window. For the illustrative convenience, the button kept clicked in this region is indicated by a bold frame for discrimination from unclicked buttons.

In the dialogue box for designating search conditions and display form shown in FIG. 12, search conditions and display form can be designated.

As the search conditions to be designated, input of the section code of the request source or expense payer, the personal name code of the requester or approver, the article request number, and the state of an article to be searched for (withdrawal, rejection, registration, and the like) can be designated.

As the display form, the number of data to be displayed in one page can be designated in the column of list display count. In addition, a status window (request state display window 02-01-01 shown in FIG. 11) for mainly displaying the current status information of the individual articles or an expense window (window 02-01-02 which is not shown) for mainly displaying the expense information of individual articles can be selected.

After the search conditions and display form are designated, the "search" button is clicked. With this operation, a request state display window according to the designated conditions is displayed on the display 22 of the client 1.

In the list of purchase request statuses of the request state display window 02-01-01, the selection button, message, state (status), request number, requester name, article name, request quantity, estimated amount, desired due date of delivery, due date of order, date of registration, date of request, date of approval, date of reception, date of order, date of delivery, date of acceptance, order quantity, delivery quantity, acceptance quantity, date of completion of order, delay answer (text), and approver name can be displayed. This will be described below in more detail.

Selection button: This button is clicked to select an article with a certain request number.

Message: ● is displayed in this column when a message for the requester or approver is present.

State (status): As the current state of an article with a certain request number, the A/S 2 selects one of "registered", "wait for approval", "approved", "rejected", and "withdrawn" (details will be described later) in accordance with operation in the window displayed by purchase request processing (03), approval request processing (05), and approval processing (07) (to be described later).

Request number: The reference number of an article in this purchase request system. The reference number is issued by the A/S 2.

Requester name: The name of a requester who has requested to purchase an article with a certain request number. The name is selected from the personnel data 7 by the A/S 2 in accordance with the user ID.

Article name: The name of a purchase-requested article. The article name is selected from the D/B 5 by the A/S 2.

Request quantity: The quantity of a purchase-requested article. This data is input by the requester.

Estimated amount: The estimated price (or actual sales price) of a purchase-requested article. The amount is selected from the D/B 5 by the A/S 2.

Desired due date of delivery: The date of delivery desired by the requester of a purchase-requested article. This data is input by the requester.

Due date of order: The actually expected due date set in actual order by the procurement department.

Date of registration: The date when the requester generates a purchase request and registers the data on the A/S 2 side for the first time.

Date of request: The date when approval of a purchase-requested and registered article is requested. This date is registered by the A/S 2 in accordance with an operation in the window displayed by approval request processing (05) (to be described later).

Date of approval: The date when an approval-requested article is approved by an approver. This date is registered by the A/S 2 in accordance with the operation of the approver in the window displayed by approval processing (07) (to be described later).

Date of reception: The date when a purchase-approved article is received by the procurement department. This date is reflected from the D/B 6 of the article ordering system to the D/B 5.

Date of order: The date when the procurement department has actually ordered an article for which reception is completed. This date is reflected from the D/B 6 of the article ordering system to the D/B 5.

Date of delivery: The date when an article with a certain request number is delivered. This date is reflected from the D/B 6 of the article ordering system to the D/B 5.

Date of acceptance: The date when a delivered article is accepted. This date is reflected from the D/B 6 of the article ordering system to the D/B 5.

Order quantity: The quantity of articles actually ordered by the procurement department. This quantity is reflected from the D/B 6 of the article ordering system to the D/B 5.

Delivery quantity: The delivery quantity of articles ordered by the procurement department. This quantity is reflected from the D/B 6 of the article ordering system to the D/B 5.

Acceptance quantity: The acceptance quantity of articles delivered. This quantity is reflected from the D/B 6 of the article ordering system to the D/B 5.

Date of completion of order: The date when the order by the procurement department is completed. This date is reflected from the D/B 6 of the article ordering system to the D/B 5.

Delay answer (text): A comment associated with delay of the due date of delivery by the procurement department. This comment is input by a person in charge in the procurement department.

Approver name: The name of an approver who has approved purchase of an article with a certain request number. The name is registered by the A/S 2 in accordance with an operation by the approver in the window displayed by approval processing (07) (to be described later).

The statuses displayed in the column of state (status) will be described.

"Registered": This status is set on the D/B 5 by the A/S 2 in the purchase request function realized by the purchase request processing module (03) (to be described later) when the requester inputs a predetermined item about a purchase-requested article and then performs a registration operation.

"Wait for approval": This status is set on the D/B 5 by the A/S 2 in the approval request function realized by the approval request processing module (05) (to be described later) when an approval request for purchase is issued, and no determination is made yet by the approver.

"Approved": This status is set on the D/B 5 by the A/S 2 in the approval processing function realized by the approval processing module (07) (to be described later) when the approver approves purchase of an article in the "wait for approval" state. The state of the approved article cannot be changed anymore.

"Rejected": This status is set on the D/B 5 by the A/S 2 in the approval processing function realized by the approval processing module (07) (to be described later) when the approver does not approve purchase of an article in the "wait for approval" state and rejects it.

"Withdrawn": This status is set on the D/B 5 by the A/S 2 when the requester withdraws the request in the request state display window 02-01-01 shown in FIG. 11 before the approver determines approval or rejection of purchase of an article in the "wait for approval" state.

The functions of buttons in the middle of the request state display window 02-01-01 shown in FIG. 11 will be described.

When the "re-load" button is clicked, the request state list is re-displayed on the basis of the current data in the D/B 5 on the basis of designation of current search conditions and display form.

After one or a plurality of articles are selected by clicking the column of selection (the same procedure as described above is used to select articles from another lists displayed on windows, and a detailed description thereof will be omitted), the "requester change" button is clicked. With this operation a requester change window 02-04-00 (not shown) in which the requester can be changed is displayed.

When one or a plurality of articles are selected, and then, the "approval request" button is clicked, an approval request window 05-01-00 (05-02-00) for the selected articles is displayed.

When one or a plurality of articles are selected, and the "correct" button is clicked, the input matters can be changed in windows 04-01-00, 04-02-00, and 04-03-00 (none are shown) displayed by the function of the correction input processing module (04). The correction input function realized by the correction input processing module (04) can transit to the approval request function realized by the approval request processing module (05).

When one or a plurality of articles are selected, and the "withdraw" button is clicked, a withdrawal confirmation window 02-03-02 (not shown) is displayed. The requester can withdraw an article in the "wait for approval" state by inputting a predetermined operation in the displayed window.

When one or a plurality of articles are selected, and the "delete" button is clicked, a deletion confirmation window 02-03-01 (not shown) is displayed. When a predetermined operation is input in the displayed window, an article currently in the "withdrawn" or "registered" state can be deleted.

When the ▲ or ▼ mark is clicked in the purchase request status list, the display order of the list can be rearranged in the ascending or descending order by a general method.

The request state display module (02) can display a details confirmation window 02-02-00 (not shown). In this window, detail information of a selected article can be confirmed.

<Purchase Request Processing Module (03) and Approval Request Processing Module (05)>

FIG. 14 is a view showing the catalog search window of the purchase request processing function of the purchase request system according to the embodiment of the present invention.

In a catalog search window 03-01-00, the requester selects an article for which purchase is to be requested from catalog data stored in the D/B 5 in advance. In the catalog data, data such as the article name, type, maker, estimated amount (estimated purchase amount), and normal due date of delivery are registered and managed in units of articles by, e.g., the person in charge in the procurement department.

An article can be selected by keyword search or genre search.

In keyword search, a keyword or a chemical substance registration number is input, and the number of search results to be displayed in one page is set in the display count input column. When the "search" button is clicked, a catalog list window 03-02-00 according to the designated conditions is displayed on the display 22 of the client 1.

FIG. 15 is a view showing the catalog list window of the purchase request processing function of the purchase request system according to the embodiment of the present invention.

In the catalog list window 03-02-00 shown in FIG. 15, the data of articles selected from the catalog data in the D/B 5 on the basis of the designated search conditions are displayed in a number corresponding to the display count designated in the catalog search window 03-01-00. When an article name is clicked, an article description window 03-04-02 (not shown) in which the description of the article is made is displayed.

The catalog list window 03-02-00 has the "many-item request" button and "one-item request" button.

More specifically, after one or more desired articles are clicked in the selection column of the catalog list window 03-02-00, the "many-item request" button is clicked. With this operation, the number of types clicked is added to the "n articles selected". When the user clicks the "n articles selected" button, a requested article selection list window 03-03-00 shown in FIG. 17 is displayed.

When only one desired article is clicked in the selection column of the catalog list window 03-02-00, and then, the "one-item request" button is clicked, a detail information input window 03-06-00 for a one-item request shown in FIG. 20 is displayed.

The windows to be opened will be described later in detail. In "many-item request", a plurality of types of articles desired are selected from the plurality of articles displayed in the catalog list window 03-02-00, and approval requests for purchase of the selected plurality of articles are issued. In "one-item request", only one desired article is selected from the plurality of articles displayed in the catalog list window 03-02-00, and an approval request for purchase of the selected article is issued.

In genre search, from a pull-down menu displayed by clicking the "open" button (FIG. 14), item groups to which the desired article belongs are selected one by one in the order of genre 1→genre 2→genre 3. When the "list display" button is clicked, a list of articles (catalog list window 03-02-00) corresponding to the item group selected in the genre is displayed.

When the "repeat" button (FIG. 14) is clicked, of articles which belong to the item group selected in genre 1 and are accepted by the previous month, articles for which purchase requests are issued by "individual request" are displayed as a list in a repeat search window 03-08-00 (not shown). This window can conveniently transit to an individual input window 03-07-00 shown in FIG. 16 when the desired article is not present in the displayed list.

The "individual request" button (FIG. 14) is used when the desired article cannot be found from the catalog data in the D/B 5 by the above-described keyword search, genre search, and "repeat" function. When this button is clicked, the individual input window 03-07-00 shown in FIG. 16 is displayed.

FIG. 16 is a view showing the individual input window of the purchase request processing function of the purchase request system according to the embodiment of the present invention. When purchase of an article unregistered on the catalog data in the D/B 5 is to be requested, detail information of the desired article can be input.

In the individual input window 03-07-00 shown in FIG. 16, necessary matters are input to the columns of the window. When a plurality of requesters are requesting purchase of an article unregistered in the catalog data, input data about the same article are transmitted from the plurality of requesters to the A/S 2. The person in charge in the procurement department can easily recognize the necessity of the article on the basis of the number of input data about the same article. For this reason, the scale of buy in a mass (lot) for the next delivery and the unit price (expected unit price) for the buy in a mass can be accurately predicted.

When the necessary matters are completely input in the individual input window, and the "next" button is clicked, an article information (detail input) window 03-06-00 shown in FIG. 20 is displayed. When the "select" button is clicked, the request is added as one of the plurality of requests, so the value n on the "n articles selected" button is incremented by one. When the "n articles selected" button is clicked, the requested article selection list window 03-03-00 shown in FIG. 17 is displayed to set the purchase quantity of the n articles, as described above.

FIG. 17 is a view showing the requested article selection list window of the purchase request processing function of the purchase request system according to the embodiment of the present invention.

The requested article selection list window 03-03-00 shown in FIG. 17 shows a case wherein three articles are selected in the catalog list window 03-02-00. The purchase quantity of each of the selected articles can be input to the column of requested quantity.

The requested article selection list window 03-03-00 has the "many-item details input" button and "one-item details input" button.

More specifically, when two or more desired articles are clicked in the column of selection of the requested article selection list window 03-03-00, and the "many-item details input" button is clicked, a detail information input window 03-05-00 for a many-item request shown in FIG. 18 is displayed.

When only one desired article is clicked in the column of selection of the requested article selection list window

03-03-00, and the "one-item details input" button is clicked, a detail information input window 03-06-00 for a one-item request shown in FIG. 20 is displayed.

FIG. 18 is a view showing the detail information input window for a many-item request of the purchase request processing function of the purchase request system according to the embodiment of the present invention.

In the detail information input window 03-05-00 shown in FIG. 18, pieces of information including the expense payer, section code, accounts (account title), expense, facility budget code, desired due date of delivery, and delivery business office are input in association with purchase of the plurality of articles selected in the requested article selection list window 03-03-00.

When the "account list" button is clicked, combinations of selectable account titles and expenses are displayed as a list.

In this embodiment, in inputting these items in this window (including the detail information input window 03-06-00 shown in FIG. 20), the cross-check function described above with reference to FIG. 30 is executed by the CPU 21 of the client 1 to check the suitability of the format of input data to a predetermined item.

FIG. 21 is a view showing conditions of cross-check executed by the client in inputting data to the detail information input window in the purchase request system according to the embodiment of the present invention.

In the list of cross-check conditions shown in FIG. 21, conditions of an input format (e.g., the character string and/or numerical string to be used) to be satisfied by input data of a predetermined item such as the expense or facility budget code are determined on the basis of data input to the column of account (account title) of the detail information input window 03-05-00 as a key. The data of cross-check conditions are stored in the D/B 5 in advance. These data are stored in the RAM 25 of the client 1 when the display window data of an HP or the like is received in step S1 of FIG. 30.

When input to the plurality of items of the detail information input window 03-05-00 is ended, and the requester clicks the "register" button, the data input at this time point is transmitted to the A/S 2.

Upon receiving the data of detail information, the A/S 2 compares the data of date input to the column of desired due date of delivery of the detail information input window with the calendar data for the company (business office), which is registered in the D/B 5 in advance, thereby determining whether the desired due date of delivery is the date of a holiday in the calendar data.

If it is determined that the desired due date of delivery is not the date of a holiday in the calendar data, the A/S 2 writes the data of detail information in the D/B 5.

Figure 22:
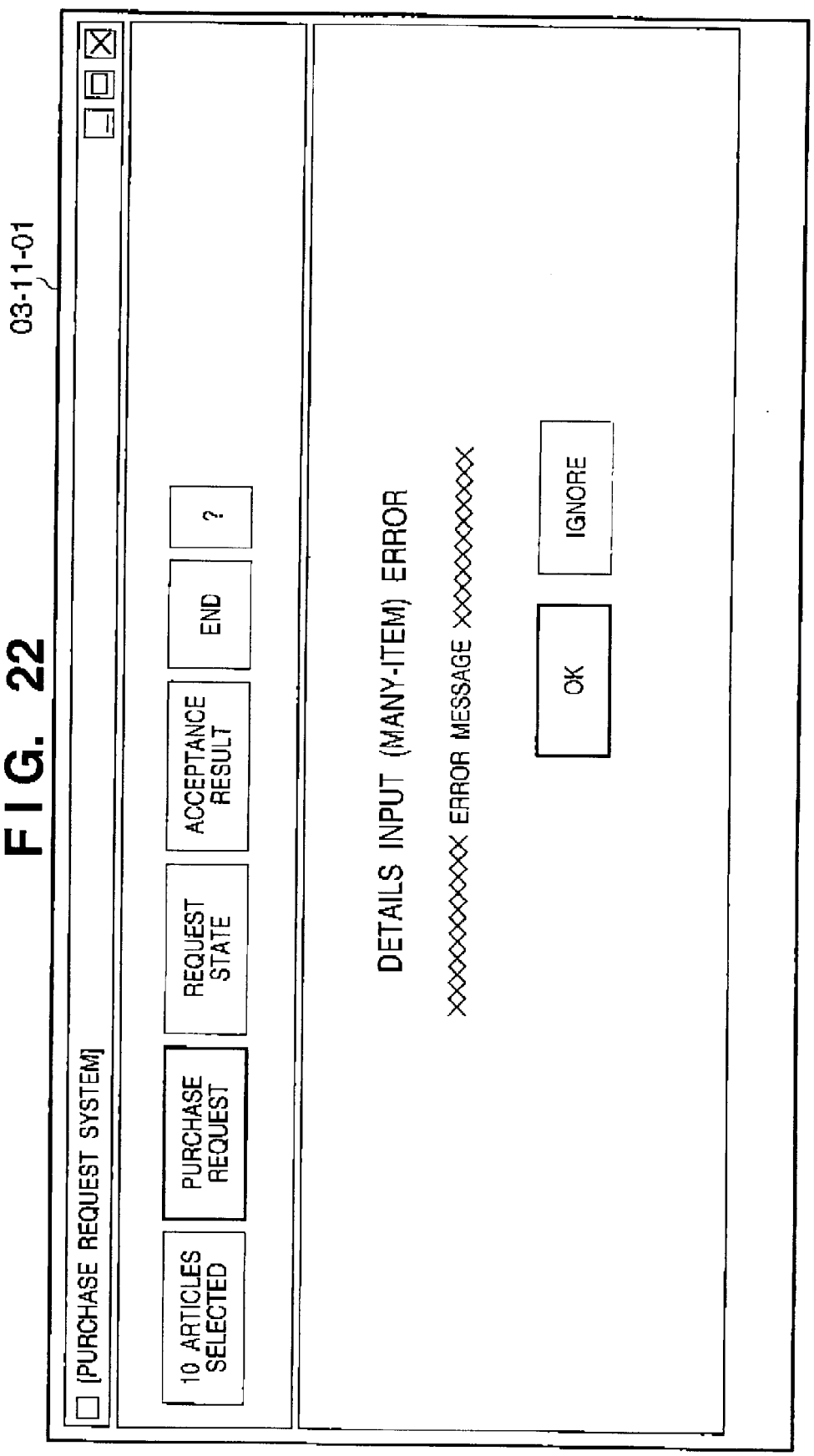
FIG. 22 is a view showing the error window displayed when the desired due date of delivery input in the detail information input window has an error in the purchase request system according to the embodiment of the present invention.

If the desired due date of delivery is the date of a holiday in the calendar data, the A/S 2 transmits predetermined display window data to the client 1 that has transmitted the data of detail information to display an error window 03-11-01 shown in FIG. 22.

FIG. 22 is a view showing the error window displayed when the desired due date of delivery input in the detail information input window has an error in the purchase request system according to the embodiment of the present invention.

In the error window 03-11-01 shown in FIG. 22, a predetermined error message representing that the desired due date of delivery input by the requester in the detail information input window 03-05-00 is the date of a holiday in the calendar is displayed. In addition, the "OK" button and "ignore" button are displayed.

When the "OK" button is clicked, the detail information input window 03-05-00 is displayed again to newly set the desired due date of delivery. When the "ignore" button is clicked, predetermined data representing that the requester desires delivery of the article at the desired due date of delivery, though he/she agrees that the desired due date of delivery currently set is the date of a holiday, is transmitted to the A/S 2. Upon receiving the predetermined data, the A/S 2 writes the data of detail information in the D/B 5.

When the "approval request" button is clicked in association with the article whose detail information is written in the D/B 5 (i.e., the article registered in the detail information input window 03-05-00), an approval request window 05-01-00 for a many-item request shown in FIG. 19, which can be displayed by the approval request processing module (05), is displayed.

The function of confirming the desired due date of delivery is also executed for the detail information input window 03-06-00 for a one-item request.

FIG. 19 is a view showing a state wherein the approval request window for a many-item request is displayed together with the detail information input window by the approval request processing function of the purchase request system according to the embodiment of the present invention.

In the approval request window 05-01-00 for a many-item request shown in FIG. 19, approvers in charge for the section to which the requester who is requesting approval belongs are displayed by a pull-down menu (when proxy approvers are set in the login window 01-02-02, the proxy approvers are displayed). The requester selects one of the approvers from the menu and clicks the "OK" button. With this operation, the purchase request operation and approval request operation for a plurality of articles by the requester are ended. At this time point, mail (FIG. 7) for notifying the approver of the approval request is transmitted to the approver selected in the menu by the mailer function of the M/S 4.

FIG. 20 is a view showing a state wherein the approval request window for a one-item request is displayed together with the detail information input window by the approval request processing function of the purchase request system according to the embodiment of the present invention.

Referring to FIG. 20, the detail information input window 03-06-00 for a one-item request and the approval request window 05-02-00 for a one-item request are displayed together. Catalog data of an article selected in the requested article selection list window 03-03-00 is displayed as "article information" at the left portion of the detail information input window. As in the approval request window 05-01-00 shown in FIG. 19, the requester requests the approver for approval in the approval request window 05-02-00. For a one-item request as well, mail for notifying the approver of the approval request is transmitted to the approver selected in the menu at this time point.

<Acceptance Result Display Processing Module (06)>

FIG. 23 is a view showing the acceptance result list window displayed by the acceptance result display function in the purchase request system according to the embodiment of the present invention.

In an acceptance result list window 06-01-00 shown in FIG. 23, an operation method designation dialogue box is displayed, like the dialogue box for designating search conditions and display form in the request state display window 02-01-01 shown in FIG. 12. When predetermined items are input to this designation dialogue box, and the "search" button is clicked, accepted articles read out from the D/B 5 are displayed as a list.

The functions that can be executed by the user of the client 1 as the requester from the display 22 have been described above.

Next, various functions that can be executed by the user of the client 1 as an approver will be described. The approver can use the above-described functions as a requester and also use the approval processing function realized by the approval processing module (07), which can be executed by only the approver, and the temporary worker management function realized by the temporary worker management module (08). In the following description, a detailed description of functions that can be used by the approver as a requester will be omitted, and the approval processing function (07) and temporary worker management function (08) will be described.

In accessing the purchase request system, the approver can log in to the system from the above-described predetermined HP. When approval request mail is received, the approver can also access the system from a mailer window shown in FIG. 7. The procedure of access will be described.

Figure 7:
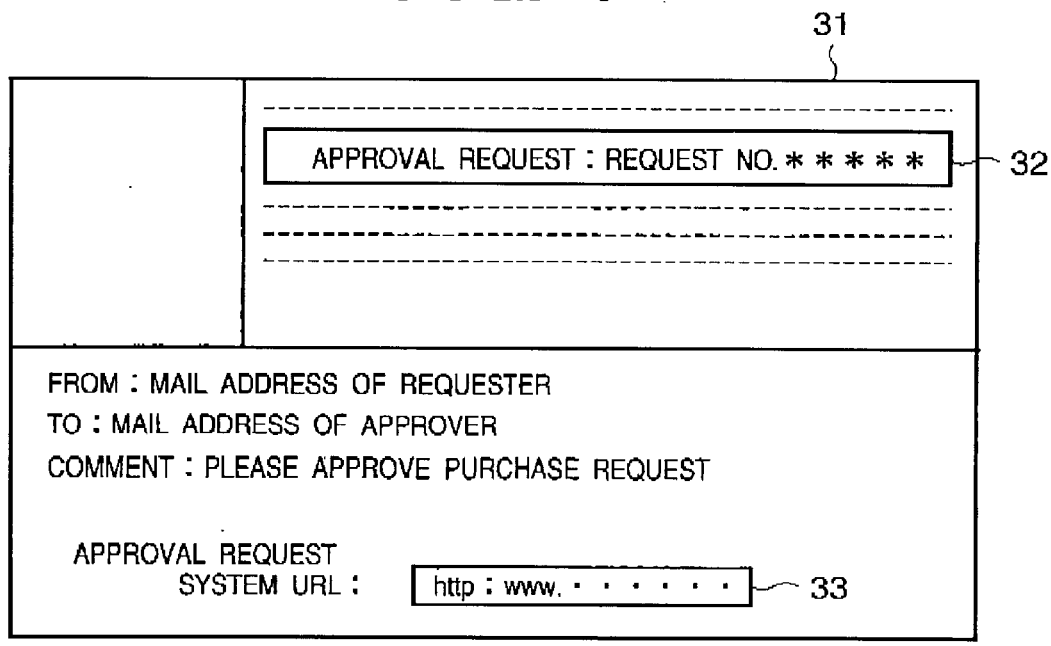
FIG. 7 is a view showing a mailer window displayed when approval request mail is sent to the approver by the mailer function of the purchase request system according to the embodiment of the present invention.

FIG. 7 is a view showing a mailer window displayed when approval request mail is sent to the approver by the mailer function of the purchase request system according to the embodiment of the present invention.

Approval request mail from the requester is transmitted by the M/S 4 to the approver designated by the requester, and a window 31 shown in FIG. 7 is displayed on the client 1 of the approver. When the approver clicks an approval request number column 32, the mail addresses of the requester and approver, a comment representing that an approval request is received, and the URL of the purchase request system are displayed at the lower portion of the window 31. When the approver clicks the URL portion of a display area 33, the above-described login window 01-01-00 shown in FIG. 9 is displayed. The approver can log in to the purchase request system from this window.

The reason why the system is set such that the login window can be opened from the mailer window is as follows. The login window has a relatively small number of displayed items and a large blank portion. When the system manager describes information items using the blank portion, the approver can easily recognize the message of the information items on the layout.

However, the window to be opened is not limited to this. For example, when priority is given to the convenience for the approver, the mail address of the approver, which is set as the destination of the mail, is acquired from the M/S 4 to the A/S 2. The user ID of the approver is read out from the D/B 5 to the A/S 2 on the basis of the mail address. Processing from login to opening of an approval request list window 07-01-00 can be automatically performed by the A/S 2 using the readout user ID. In this case, since the approver need not perform the login operation by himself/herself, the convenience for the approver can be improved.

<Approval Processing Module (07)>

When login of the approver from the login window 01-01-00 is ended, the approval request list window 07-01-00 shown in FIG. 24 is displayed on the display 22 of the client 1 of the approver by the function of the approval processing module (07), as described above with reference to FIGS. 31 and 32.

FIG. 24 is a view showing the approval request list window displayed by the approval processing function in the purchase request system according to the embodiment of the present invention.

Not only buttons representing functions that can be used by a requester but also the "approval processing" button and "temporary worker management" button are provided at the upper portion of the approval request list window 07-01-00 shown in FIG. 24.

In the approval request list window, various data of an article for which approval request mail is received are displayed as a list, as shown in FIG. 24. Even when one approval request number is clicked in the window 31 shown in FIG. 7, all articles read out from the D/B 5 by the A/S 2 on the basis of the user ID of the approver are displayed as a list on the approval request window.

When a request number in the list displayed in the window is clicked, a details confirmation window (not shown) in which detail information of the article with the request number is displayed. The window has the "approval select" button and "rejection select" button. The functions of these buttons will be described below.

Figure 25:
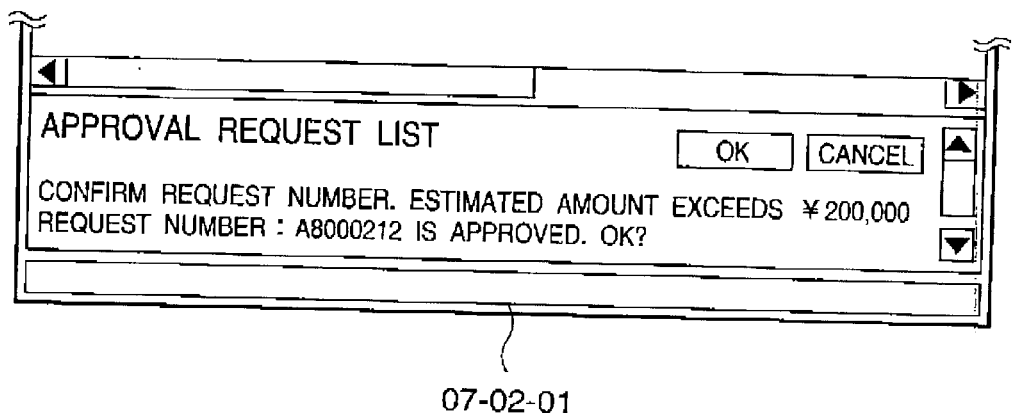
FIG. 25 is a view showing the approval processing window of the approval processing function in the purchase request system according to the embodiment of the present invention.

FIG. 25 is a view showing the approval processing window of the approval processing function in the purchase request system according to the embodiment of the present invention.

A approval processing window 07-02-01 shown in FIG. 25 is displayed at the lower portion of the approval request list window or as another window when one or more articles are selected in the approval request list window 07-01-00, and the "approval select" button is clicked. When an amount more than ¥200,000 is set for an article to be approved, a predetermined message representing this amount is displayed, as shown in FIG. 25. This aims at calling the approver's attention to confirm whether the purchase quantity of the article has no input error. When the "OK" button is clicked in this approval processing window 07-02-01, purchase of the article displayed in this window is approved. Predetermined data representing approval is transmitted to the A/S 2, and the status of the article in the D/B 5 is updated from "wait for approval" to "approved".

When the status of the article in the D/B 5 is updated to "approved", the column of the approved article is deleted from the displayed items of the list of the approval request list window 07-01-00 (In the display example in FIG. 24, one article is displayed as an approval-requested article. In this case, only predetermined items of the list are displayed by "approving" the article).

Figure 26:
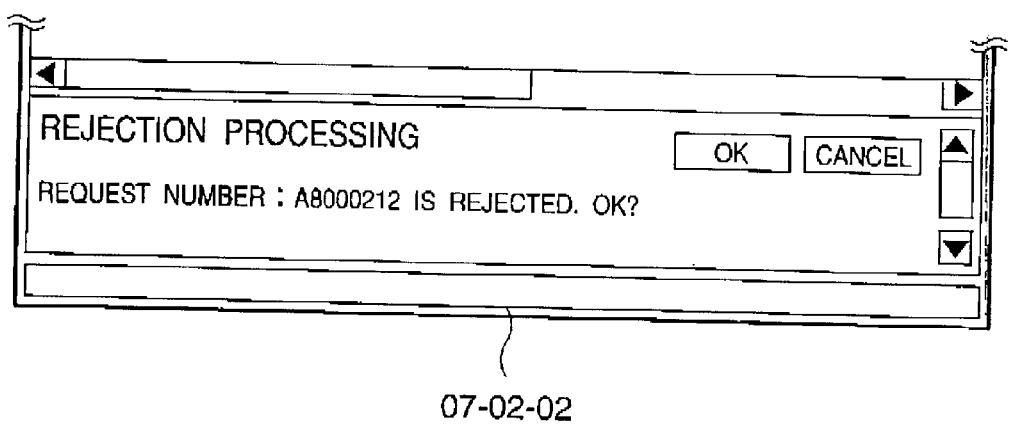
FIG. 26 is a view showing the rejection processing window of the approval processing function in the purchase request system according to the embodiment of the present invention.

FIG. 26 is a view showing the rejection processing window of the approval processing function in the purchase request system according to the embodiment of the present invention.

A rejection processing window 07-02-02 shown in FIG. 26 is displayed at the lower portion of the approval request list window or as another window when one or more articles are selected in the approval request list window 07-01-00, and the "rejection select" button is clicked. When the "OK" button is clicked in this rejection processing window 07-02-02, purchase of the article displayed in this window is rejected. Predetermined data representing rejection is transmitted to the A/S 2, and the status of the article in the D/B 5 is updated from "wait for approval" to "rejected".

When the approver performs the approval or rejection operation as described above, data in the D/B 5 is updated. In addition, mail for notifying the requester that the purchase of the approval-requested article is approved or rejected is transmitted to the requester by the automatic mail function of the M/S 4.

Figure 8:
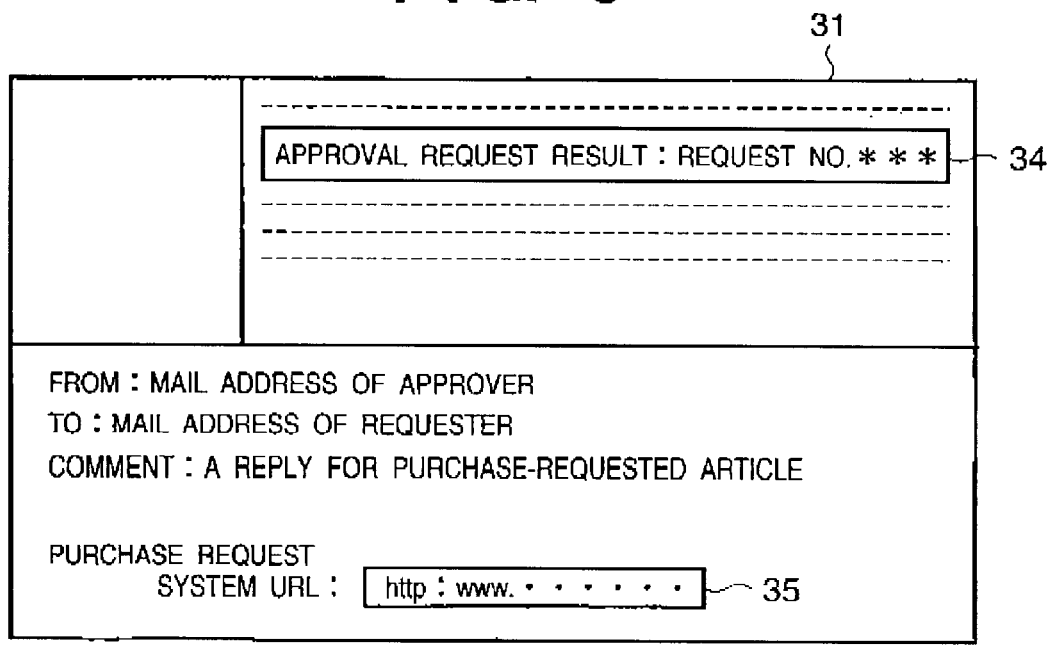
FIG. 8 is a view showing a mailer window displayed when mail replying to the approval request is sent to the requester by the mailer function of the purchase request system according to the embodiment of the present invention.

FIG. 8 is a view showing a mailer window displayed when mail replying to the approval request is sent to the requester by the mailer function of the purchase request system according to the embodiment of the present invention.

Mail from the approver is automatically transmitted by the M/S 4 to the mail address which is registered in advance by the requester of the article for which approval or rejection is determined. Thereby, a window 31 shown in FIG. 8 is displayed on the client 1 of the requester. When the requester clicks an approval request number column 34, the mail addresses of the requester and approver, a comment representing that the reply to the approval request is received, and the URL of the purchase request system are displayed at the lower portion of the window 31. When the requester clicks the URL portion of a display area 35, the above-described login window 01-01-00 shown in FIG. 9 is displayed. The requester can log in to the purchase request system from this window and confirm the latest state of the requested article in the request state display window 02-01-01.

In this case as well, as in the mail window shown in FIG. 7, when the mail address of the requester, which is set as the destination of the mail, is acquired from the MIS 4 to the A/S 2. The user ID of the requester is read out from the D/B 5 to the A/S 2 by looking up the D/B 5 on the basis of the mail address. When processing from login to opening of the request state display window 02-01-01 is automatically performed by the A/S 2 using the readout user ID, the requester need not perform the login operation by himself/herself, the convenience for the requester can be improved.

<Temporary Worker Management Processing Module (08)>

When the "temporary worker management" button is clicked by the approver, a temporary worker list window 08-01-00 shown in FIG. 27 is displayed by the function of the temporary worker management processing module (08).

FIG. 27 is a view showing the temporary worker list window of the temporary worker management function in the purchase request system according to the embodiment of the present invention.

In the temporary worker list window 08-01-00 shown in FIG. 27, a temporary worker (the user of the client 1 who is not registered in the personnel data 7) can be registered, corrected, or deleted as a requester of this system. At this time, on the basis of the user ID (employee code) of the login user as an approver, data of temporary workers registered by the section code of the section managed by the user are read out from the D/B 5, and the temporary workers are displayed on the client 1 of the approver as a list in the window.

To register a temporary worker, the "register" button of the temporary worker list window 08-01-00 is clicked. A temporary worker registration window 08-02-01 shown in FIG. 28 is displayed at the lower portion of the temporary worker list window or as another window.

FIG. 28 is a view showing the temporary worker registration window of the temporary worker management function in the purchase request system according to the embodiment of the present invention.

In the temporary worker registration window 08-02-01 shown in FIG. 28, predetermined items such as the name, date of birth, staffing agency, and business office of a temporary worker to be registered are input, and then, the "OK" button is clicked. The input data are transmitted to the A/S 2 and written in the D/B 5.

To delete a temporary worker, the target temporary worker is selected from the list in the temporary worker list window 08-01-00, and the "delete" button is clicked. With this operation, a temporary worker deletion window 08-02-03 shown in FIG. 29 is displayed at the lower portion of the temporary worker list window or as another window.

FIG. 29 is a view showing the temporary worker deletion window of the temporary worker management function in the purchase request system according to the embodiment of the present invention.

In the temporary worker deletion window 08-02-03 shown in FIG. 29, the registered information of the selected temporary worker is displayed. When the "OK" button in this window is clicked, predetermined data representing deletion is transmitted to the A/S 2. The registered data of the temporary worker is deleted from the D/B 5.

To correct the registered data of a temporary worker, the "correct" button is clicked in accordance with the same procedure as that for deletion. A temporary worker correction window 08-02-02 (not shown) substantially the same as for deletion in FIG. 29 is displayed. Data is corrected in this window, and the "OK" button is clicked.

According to the temporary worker management function realized by the above-described temporary worker management processing module (08), temporary workers which are not registered in the personnel data 7 can be appropriately managed.

[Other Embodiments]

The object of the present invention can be achieved even by supplying a storage medium storing software program codes for realizing the function of the above-described embodiment to a client and server, and causing the computer (or a CPU or an MPU) of the client or server to read out and execute the program codes stored in the storage medium.

In this case, the program codes read out from the storage medium realize the function of the above-described embodiment by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The function of the above-described embodiment is realized not only when the readout program codes are executed by the computer but also when the OS (Operating System) running on the computer performs part or all of actual processing on the basis of the instructions of the program codes.

The function of the above-described embodiment is also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the above embodiment, the conventional business procedures including preparation, issue, and transfer of physical purchase slips are abolished, and the following matters are realized.

According to the client 1 (client 1 used by the user as a requester) as the purchase request apparatus in the above-described purchase request system, purchase of various articles can be efficiently requested.

According to the client 1 (client 1 used by the user as a requester) as the purchase request apparatus in the above-described purchase request system, purchase requests of various articles and change in requested contents become flexible.

According to the client 1 (client 1 used by the user as a requester) as the purchase request apparatus in the above-described purchase request system, data associated with a desired article to be purchase-requested can be accurately input.

According to the above-described purchase request system, various articles can be efficiently purchased using the existing terminal group.

According to the above-described purchase request system, various articles can be efficiently purchased. In addition, according to the above-described purchase request system, temporary workers which are not registered in the personnel database can be appropriately managed.

According to the client 1 (client 1 used by the user as an approver) as the purchase request approving apparatus in the above-described purchase request system, approval or rejection of a purchase-requested article can be efficiently input.

As many apparently widely different embodiments of the present invention can be made without departing from the spirit and scope thereof, it is to be understood that the invention is not limited to the specific embodiments thereof except as defined in the appended claims.

What is claimed is:

1. A purchase request system including a plurality of terminals capable of requesting purchase of a desired article, said system comprising:
   input means for inputting identification information of a user;
   determination means for determining the identification information of a user input by said input means on the basis of information associated with the user, the information associated with the user being prepared in advance, wherein a user who can approve or reject is identifiably associated with the information associated with the user; and
   display means for displaying a first window and a software button for opening a second window (a) when it is determined that the input identification information represents the user who can approve or reject by a determination result of said determination means and (b) after the user is logged into said system,
   wherein the first window displays (i) a list window of at least one approval-requested article for which approval from the user is requested, (ii) a first button capable of inputting approval of an article selected from the at least one approval-requested article, and (iii) a second button capable of inputting rejection of an article selected from the at least one approval-requested article, and
   wherein, when the second window is opened in response to an operation of the software button by the user, the user is capable of inputting a purchase request of a desired article in the displayed second window.

2. A purchase request system including a plurality of terminals capable of requesting purchase of a desired article, said system comprising:
   a first terminal capable of inputting information associated with a desired article to request purchase of the article;
   an electronic mail containing information for opening a list window to display as a list all approval-requested articles for which approval from the user is requested;
   communication means for transmitting said electronic mail to a user who can approve or reject purchase of the article in accordance with a determination of the information associated with the article input in said first terminal, the electronic mail being transmitted to the user so as to inform that approval for the purchase of the article is requested, the electronic mail containing information for opening a list window capable of displaying as a list all approval-requested articles for which approval from the user is requested;
   a second terminal capable of receiving the electronic mail and displaying information for opening the list window; and
   processing means for, when a processing capable of opening the list window is selected based on the information for opening the list window in the received electronic mail, obtaining identification information of the user who can approve or reject a purchase of the article based on a mail address of the user and automatically opening the list window at said second terminal by using the obtained identification information of the user.

3. A purchase request system including a plurality of terminals capable of requesting purchase of a desired article, said system comprising:
   a first terminal capable of inputting approval or rejection of a purchase request of the desired article;
   an electronic mail containing information for opening a window to display status of the article which is requested by the uer;
   communication means for transmitting said electronic mail to a user who has requested purchase of the article in accordance with a determination of approval or rejection for purchase of the article in said first terminal, the electronic mail being transmitted to the user so as to inform that approval or rejection for purchase of the article is determined;
   a second terminal capable of receiving the electronic mail and displaying information for opening the window; and
   processing means for, when a processing capable of opening the window is selected based on the information for opening the list window in the received electronic mail, obtaining identification information of the user who has requested purchase of the article based on a mail address of the user and automatically opening the window at said second terminal by using the obtained identification information of the user.

4. The system according to claim 3, the system further comprising generation means for generating master information for processing the order for the article in accordance with a determination of the information representing approval for the purchase request of the article input in said first terminal.

5. A purchase request apparatus capable of requesting purchase of a desired article, said apparatus comprising:
   input means for inputting user identification information of a user; and
   display means for displaying a first window and a software button for opening a second window when (a) it is determined by a determination means that the input identification information represents a user who can approve or reject and (b) after the user is logged into said apparatus,
   wherein the first window displays (i) a list window of at least one approval-requested article for which approval from the user is requested, (ii) a first button capable of inputting approval of an article selected from the at least one approval-requested article, and (iii) a second button capable of inputting rejection of an article selected from the at least one approval-requested article, and
   wherein, when the second window is opened in response to an operation of the software button by the user, the user is capable of inputting a purchase request of a desired article in the displayed second window.

* * * * *

UNITED STATES PATENT AND TRADEMARK OFFICE
CERTIFICATE OF CORRECTION

| | | |
|---|---|---|
| PATENT NO. | : 6,763,335 B1 | |
| APPLICATION NO. | : 09/385841 | |
| DATED | : July 13, 2004 | |
| INVENTOR(S) | : Nanbu et al. | |

It is certified that error appears in the above-identified patent and that said Letters Patent is hereby corrected as shown below:

COVER PAGE:

(56)   References Cited,
FOREIGN PATENT DOCUMENTS,
"09044567" should read --09-044567--; and
"09-31970-5" should read -- 09-319705 --.

OTHER PUBLICATIONS,
Under Dialog file 264, "No. 0003521)," should read -- No. 00013521),--.

COLUMN 9:
Line 61, "WIS 3" should read --W/S 3 --.

COLUMN 23:
Line 24, "wherein a user" should read -- wherein (a) a first user -- and "reject is" should
    read -- reject and (b) a second user who can input a purchase request are --;
Line 26, "with the user; and" should read -- with the first and second user, --;
Line 27, "display" should read -- first display --;
Line 28, "window (a) when it" should read -- window when (a) it --;
Line 30, "user who can approve or reject" should read --first user--;
Line 32, "user" should read -- first user -- and "system," should read -- system; and
        second display means for displaying a third window and a software
    button for opening the second window when (a) it is determined that the input
    identification information represents the second user and (b) after the second
    user is logged into said system, the third window enables the second user to
    view a status of a purchase request of a desired article inputted by the second
    user, --;
Line 35, "user" should read -- second user --;
Line 43, "by the user," should read --displayed by said first or second display means, --;
    and
Line 44, "user is" should read -- first and second users are --.

UNITED STATES PATENT AND TRADEMARK OFFICE
CERTIFICATE OF CORRECTION

PATENT NO. : 6,763,335 B1
APPLICATION NO. : 09/385841
DATED : July 13, 2004
INVENTOR(S) : Nanbu et al.

It is certified that error appears in the above-identified patent and that said Letters Patent is hereby corrected as shown below:

COLUMN 24:
Line 17, "uer;" should read -- user; --;
Line 46, "and" should be deleted;
Line 47, "display" should read -- first display --;
Line 50 and 51, "user" should read -- first user --;
Line 52, "apparatus," should read -- apparatus and
        second display means for displaying a third window and a software
   button for opening the second window when (a) it is determined that the input
   identification information represents the second user who can input a purchase
   request and (b) after the second user is logged into said system, the third
   window enables the second user to view a status of a purchase request of a
   desired article inputted by the second user, --;
Line 55, "user" should read -- second user --;
Line 63, "by the user," should read -- displayed by said first or second display
        means, --; and
Line 64, "user is" should read -- first and second users are --.

Signed and Sealed this

Seventeenth Day of October, 2006

JON W. DUDAS
*Director of the United States Patent and Trademark Office*